US009912736B2

(12) United States Patent
Allen et al.

(10) Patent No.: US 9,912,736 B2
(45) Date of Patent: Mar. 6, 2018

(54) COGNITIVE REMINDER NOTIFICATION BASED ON PERSONAL USER PROFILE AND ACTIVITY INFORMATION

(71) Applicant: International Business Machines Corporation, Armonk, NY (US)

(72) Inventors: Corville O. Allen, Morrisville, NC (US); Lisa M. W. Bradley, Cary, NC (US); Christina R. Carlson, Chanhassen, MN (US); Andrew R. Freed, Cary, NC (US); Roderick C. Henderson, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 14/719,531

(22) Filed: May 22, 2015

(65) Prior Publication Data
US 2016/0342694 A1     Nov. 24, 2016

(51) Int. Cl.
    *G06F 17/30* (2006.01)
    *H04L 29/08* (2006.01)

(52) U.S. Cl.
    CPC ........ *H04L 67/10* (2013.01); *G06F 17/30654* (2013.01); *G06F 17/30684* (2013.01); *H04L 67/22* (2013.01); *H04L 67/306* (2013.01)

(58) Field of Classification Search
    None
    See application file for complete search history.

(56) References Cited

U.S. PATENT DOCUMENTS

| 5,751,378 A | 5/1998 | Chen et al. |
| 6,542,889 B1 | 4/2003 | Aggarwal et al. |
| (Continued) | | |

FOREIGN PATENT DOCUMENTS

| WO | WO02/29618 A1 | 4/2002 |
| WO | WO2011/065617 A1 | 6/2011 |
| (Continued) | | |

OTHER PUBLICATIONS

Alen, Corville et al., "Determining Temporal Categories for a Domain of Content for Natural Language Processing", filed Jun. 5, 2014, U.S. Appl. No. 14/297,335.

(Continued)

*Primary Examiner* — Anh Tai Tran
(74) *Attorney, Agent, or Firm* — Stephen J. Walder, Jr.; Diana R. Gerhardt

(57) ABSTRACT

A data processing system determines whether a natural language query or a result has a temporal characteristic. In response, at least one of user profile information or user activity history information for a user is analyzed to identify user characteristics indicative of a timeframe for scheduling a reminder notification of the result. A timeframe for scheduling the reminder notification is calculated based on results of analyzing the user profile information or user activity history information. A reminder notification is scheduled to be output at a scheduled reminder notification time based on the calculated timeframe. At a later time, in response to the later time being equal to or later than the scheduled reminder notification time, the reminder notification is output to a client device associated with the user, wherein the reminder notification specifies the result generated for the natural language query.

21 Claims, 9 Drawing Sheets

(56) References Cited

U.S. PATENT DOCUMENTS

| | | |
|---|---|---|
| 7,225,187 B2 | 5/2007 | Dumais et al. |
| 7,295,965 B2 | 11/2007 | Haigh et al. |
| 7,743,340 B2 | 6/2010 | Horvitz et al. |
| 7,945,525 B2 | 5/2011 | Ananthanarayanan et al. |
| 8,254,685 B2 | 8/2012 | Greene et al. |
| 8,275,803 B2 | 9/2012 | Brown et al. |
| 8,402,054 B2 | 3/2013 | Frazier et al. |
| 8,538,744 B2 | 9/2013 | Roberts et al. |
| 8,555,281 B1 | 10/2013 | van Dijk et al. |
| 8,600,986 B2 | 12/2013 | Fan et al. |
| 8,626,784 B2 | 1/2014 | Beaudreau et al. |
| 8,636,515 B2 | 1/2014 | Burgin et al. |
| 8,706,653 B2 | 4/2014 | Kasneci et al. |
| 8,935,277 B2 | 1/2015 | Kuchmann-Beauger et al. |
| 9,558,507 B2 | 1/2017 | Zilkha |
| 2006/0246410 A1 | 11/2006 | Iwayama |
| 2008/0104065 A1 | 5/2008 | Agarwal et al. |
| 2009/0287678 A1 | 11/2009 | Brown et al. |
| 2010/0281091 A1 | 11/2010 | Wakao et al. |
| 2011/0066587 A1 | 3/2011 | Ferrucci et al. |
| 2011/0125734 A1 | 5/2011 | Duboue et al. |
| 2011/0125844 A1 | 5/2011 | Collier et al. |
| 2012/0065480 A1 | 3/2012 | Badilini et al. |
| 2012/0078837 A1 | 3/2012 | Bagchi et al. |
| 2012/0078873 A1 | 3/2012 | Ferrucci et al. |
| 2012/0078890 A1 | 3/2012 | Fan et al. |
| 2012/0191716 A1 | 7/2012 | Omoigui |
| 2013/0007037 A1 | 1/2013 | Azzam et al. |
| 2013/0007055 A1 | 1/2013 | Brown et al. |
| 2013/0017524 A1 | 1/2013 | Barborak et al. |
| 2013/0018652 A1 | 1/2013 | Ferrucci et al. |
| 2013/0029307 A1 | 1/2013 | Ni et al. |
| 2013/0041921 A1 | 2/2013 | Cooper et al. |
| 2013/0052630 A1 | 2/2013 | Mine et al. |
| 2013/0066886 A1 | 3/2013 | Bagchi et al. |
| 2013/0097110 A1 | 4/2013 | Kwon |
| 2013/0103382 A1 | 4/2013 | Kim et al. |
| 2013/0111348 A1* | 5/2013 | Gruber ............ G06F 17/3087 715/727 |
| 2013/0218914 A1 | 8/2013 | Stavrianou et al. |
| 2013/0226453 A1 | 8/2013 | Trussel et al. |
| 2013/0304730 A1 | 11/2013 | Zhou |
| 2014/0058766 A1 | 2/2014 | Yu et al. |
| 2014/0058986 A1 | 2/2014 | Boss et al. |
| 2014/0172882 A1 | 6/2014 | Clark et al. |
| 2014/0172883 A1 | 6/2014 | Clark et al. |
| 2015/0290531 A1 | 10/2015 | Herz et al. |
| 2015/0351655 A1 | 12/2015 | Coleman |

FOREIGN PATENT DOCUMENTS

| | | |
|---|---|---|
| WO | WO2012/122196 A2 | 9/2012 |
| WO | WO2013/192584 A1 | 12/2013 |

OTHER PUBLICATIONS

Allen, Corville et al., "Time-Based Optimization of Answer Generation in a Question and Answer System", filed Jun. 5, 2014, U.S. Appl. No. 14/297,267.

"Apache ODF Toolkit (incubating)", The Apache Software Foundation, http://incubator.apache.org/odftoolkit/odfdom/index.html, accessed online Mar. 12, 2015, 2 pages.

"Ignoring SSL certificate in Apache HttpClient 4.3", Stack Overflow, http://stackoverflow.com/questions/19517538/ignoring-ssl-certificate-in-apache-httpclient-4-3, accessed online Mar. 12, 2015, 5 pages.

"List of IBM Patents or Patent Applications Treated as Related", Aug. 12, 2015, 2 pages.

"Method and System for Managing Cases When an Answer Changes in a Question Answering System", IP.com, IP.com No. 000237471, Jun. 18, 2014, 3 pages.

"Microsoft Office—Tools to Get Work Done", Microsoft Corporation, http://office.microsoft.com/en-us/, accessed online Mar. 12, 2015, 5 pages.

"Natural language processing", Wikipedia, http://en.wikipedia.org/wiki/Natural_language_processing, last modified Mar. 10, 2015, accessed online Mar. 12, 2015, 12 pages.

"Oracle Outside in Technology", Oracle Corporation, http://www.oracle.com/us/technologies/embedded/025613.htm, accessed online Mar. 12, 2015, 2 pages.

"SPSS Statistics", IBM Corporation, http://www-01.ibm.com/software/analytics/spss/products/statistics/, accessed online Mar. 12, 2015, 2 pages.

"SPSS Text Analytics for Surveys", IBM Corporation, http://www-01.ibm.com/software/analytics/spss/products/statistics/text-analytics-for-surveys/, accessed online Mar. 12, 2015, 2 pages.

High, Rob, "The Era of Cognitive Systems: An Inside Look at IBM Watson and How it Works", IBM Corporation, Redbooks, Dec. 12, 2012, 16 pages.

Li, Fangtao et al., "Answer Validation by Information Distance Calculation", Coling 2008: Proceedings of the 2nd Workshop on Information Retrieval for Question Answering (IR4QA) Aug. 2008, pp. 42-29.

Magnini, Bernardo et al., "Is it the Right Answer? Exploiting Web Redundancy for Answer Validation", Proceedings of the 40th Annual Meeting of the Association for Computational Linguistics (ACL), Philadelphia, Jul. 2002, pp. 425-432.

McCord, M.C. et al., "Deep parsing in Watson", IBM J. Res. & Dev. vol. 56 No. 3/4 Paper 3, May/Jul. 2012, pp. 3:1-3:15.

Oliver, Andrew et al., "Apache POI—the Java API for Microsoft Documents", The Apache Software Foundation, http://poi.apache.org/, accessed online Mar. 12, 2015, 2 pages.

Yuan, Michael J., "Watson and healthcare, How natural language processing and semantic search could revolutionize clinical decision support", IBM developerWorks, IBM Corporation, Apr. 12, 2011, 14 pages.

"List of IBM Patents or Patent Applications Treated as Related", Oct. 28, 2015, 2 pages.

* cited by examiner

COGNITIVE REMINDER NOTIFICATION BASED ON PERSONAL USER PROFILE AND ACTIVITY INFORMATION

BACKGROUND

The present application relates generally to an improved data processing apparatus and method and more specifically to mechanisms for providing cognitive reminder notification mechanisms based on personal user profile and activity information.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method in a data processing system comprising a processor and a memory that operate to implement a natural language processing system, is provided. The method comprises generating, by the natural language processing system implemented by the data processing system, a result of processing a natural language query. The method further comprises determining, by the data processing system, that at least one of the natural language query or the result comprises a temporal characteristic. Moreover, the method comprises, in response to determining that at least one of the natural language query or the result comprises a temporal characteristic, analyzing, by the data processing system, at least one of user profile information or user activity history information for a user to identify user characteristics indicative of a timeframe for scheduling a reminder notification of the result. In addition, the method comprises calculating, by the data processing system, the timeframe for scheduling the reminder notification based on results of analyzing the user profile information or user activity history information. Furthermore, the method comprises scheduling, by the data processing system, a reminder notification to be output at a scheduled reminder notification time based on the calculated timeframe. The method also comprises, at a later time, in response to the later time being equal to or later than the scheduled reminder notification time, outputting the reminder notification to a client device associated with the user, wherein the reminder notification specifies the result generated for the natural language query.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
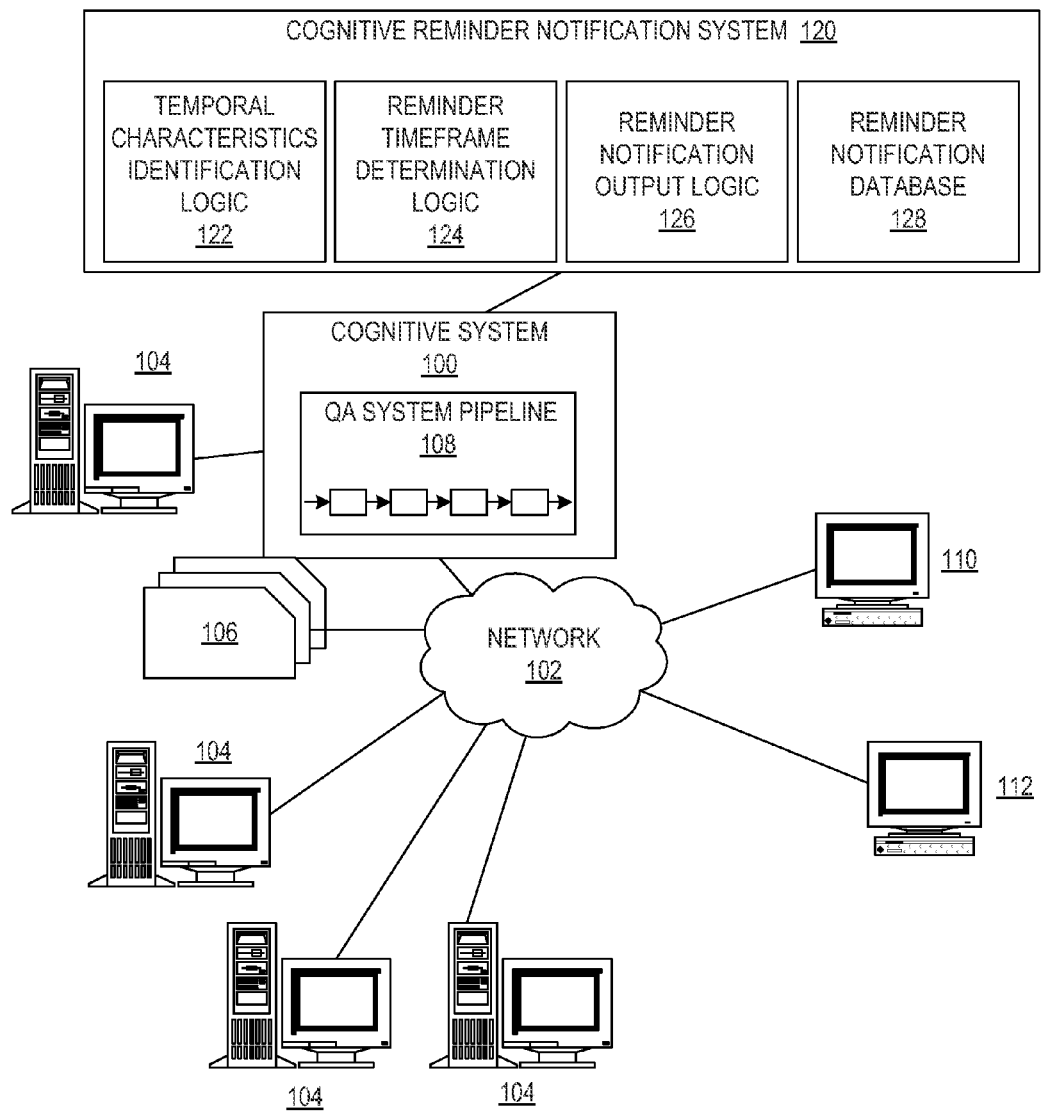
FIG. 1 depicts a schematic diagram of one illustrative embodiment of a question/answer creation (QA) system in a computer network.

The illustrative embodiments provide mechanisms for providing cognitive reminders and notifications in conjunction with a natural language processing system, such as a natural language search engine, a Question and Answer (QA) system, information retrieval system, or the like. For purposes of the following description, it will be assumed that the natural language processing system is a QA system, such as the IBM Watson™ QA system available from International Business Machines (IBM) Corporation of Armonk, N.Y. It should be appreciated that this is only an example and is not intended to state or imply any limitation as to the types of natural language processing systems with which the mechanisms of the illustrative embodiments may be utilized. To the contrary, any system that retrieves information based on a natural language query or request may make use of the mechanisms of the illustrative embodiments to generate reminders and notifications.

Many times, users search for information or ask questions of a QA system and receive results/answers to the search request or question that are not immediately needed or useable by the user. This is generally because the user is not aware of the results that will be returned prior to getting the results of the search request or question processing, otherwise the user would not need to submit the search request or question in the first place. For example, a user may, in August, ask the question "When should I plant my rose bushes?" and the QA system may respond with an answer of "late February to early April." While this answer is correct, not knowing the time frame of the answer that was going to be returned, the answer is not immediately of use to the user since the time frame at which the question was asked is in August, at least 6 months prior to the time frame of the answer to the question. In such cases, the user can either try to remember the answer until such time as the answer is useable, or the user may try to remember, at a better time, to re-ask the QA system the same question. In either case, the burden is placed on the user to take the initiative of determining when the answer will be useable to the user and thus, how long the user must either remember the information or wait to re-ask the question.

In addition, issues may arise when a user submits a search request or question and obtains a result/answer (hereafter assumed to be an answer to a question posed to a QA system) that is not immediately useable and this answer changes before the timeframe when the answer is useable. For example, a user, in June of 2014, may ask "When does the next AIX operating system release?" and the answer may be "Oct. 27, 2015." Between June 2014 and Oct. 27, 2015, the release date of the AIX operating system may be moved up, or moved back, and thus, the original answer to the question may no longer be correct. Thus, if the user relies on his/her own memory to either remember the answer or remember a future time to resubmit the question, the user may operate under stale information.

Furthermore, it is recognized that individual users have different individual reminder/notification characteristics that indicate how quickly a user may act upon information that the user is provided. Thus, different users may require different times from a future time point at which reminders/notifications should be provided to those users depending upon their individual characteristics.

The illustrative embodiments provide mechanisms for determining when an answer to a question input by a user includes a temporal characteristic that indicates that the answer is possibly not immediately useable to the user. In response to such a determination, the user may be presented with an option to schedule a future reminder notification to be sent to the user when the answer to the question is within a timeframe that the answer becomes more immediately useable by the user. Alternatively, this reminder notification may be automatically generated and stored for the user. The scheduling of the reminder notification may take a variety of forms.

The illustrative embodiments, when scheduling a reminder notification, comprise mechanisms for determining the best time to notify the user of the answer to their previously submitted question. In so doing, the mechanisms of the illustrative embodiments provide valuable input at the time needed. The times at which to schedule reminder notifications may be determined based on temporal characteristics of the answer, temporal characteristics of the question, and temporal characteristics associated with the user that submitted the input question. Based on a combination of these various temporal characteristics, the cognitive reminder notification mechanisms of the illustrative embodiments determine a best time to schedule the future reminder notification for output to the user.

The temporal characteristics of the input question, answer, and user may be determined in a variety of ways as discussed hereafter. In general, the temporal characteristics of the input question may be identified through natural language processing techniques that operate on the input question and identify time based keywords or phrases, concept relationships associated with time in the language of the input question, or the like. For example, a database of keywords and phrases may be established and used by the natural language processing mechanisms of the illustrative embodiments to determine if the input question itself specifies a time, e.g., "What day in September is labor day?" or "What month has the highest flu incidents?" Other semantic and syntactic analyses may also be performed to identify whether the question itself specifies a time. For example, lexical answer type (LAT) and focus of the question may be analyzed to identify temporal characteristics.

In addition to analyzing the question to determine if it specifically identifies a time characteristic, the mechanisms of the illustrative embodiments may further analyze the question to determine if, while not explicitly specifying a time characteristic, the question contains some implicit aspect of time that will be reflected in the answer, e.g., "When does it snow in NY?" or "What is the best time to go skiing in Colorado?" In these examples, the keyword "when", while not explicitly specifying a time, such as in the case of the keywords "month" or "day" in the previous examples, is a term recognized as asking for a time answer. In addition, the keyword "time" is recognized as being related to an implicit time aspect even though a specific time is not specified by this keyword.

Implicit timing aspects may further be identified via known relationships between keywords or key phrases and various other keywords, key phrases, or concepts. For example, the term "skiing" in the above example may be associated with a particular type of season, e.g., the winter season, which is a time frame. Moreover, the keyword "season" may be known by calendar indication of the season start date and/or based on the location/typical season knowledge. Thus, multiple levels of chains of keywords, key phrases, and concepts may be identified within the input question that may be indicative of the input question soliciting an answer that is time based.

The temporal characteristics of the answer to the input may be determined in a similar manner by analyzing keywords and key phrases in the answer that is generated by the QA system and/or analyzing the answer for timing aspects. Moreover, the lexical answer type (LAT) of the answer may be analyzed to determine the type of answer provided and whether that type of answer corresponds to a temporal characteristic type, e.g., a date/time LAT. Some answers may have multiple parts, e.g., steps in a process, in which case each part may have an associated temporal characteristic or timing aspect that may be identified via analysis of the answer using the mechanisms of the illustrative embodiments.

One mechanism that may be employed to assist in the analysis of the input question and the resulting answer is described in commonly owned and co-pending U.S. patent application Ser. No. 14/297,335, entitled "Determining Temporal Categories for a Domain of Content for Natural Language Processing," filed Jun. 5, 2014, and which is hereby incorporated by reference. While this mechanism is primarily directed to determining the correct timeframe for a particular domain of content based on natural language processing of the content in the domain, the same mechanisms may be applied to a question and/or answer to determine temporal characteristics of the question and/or answer. Moreover, the mechanisms of the co-pending application may be used to determine a temporal characteristic of the domain associated with an input question and this temporal characteristic may be utilized when determining the scheduling of a future reminder notification as described hereafter.

The above mechanisms are utilized to determine whether or not the question and/or answer have temporal characteristics that indicate that the user may wish to be reminded of the answer to the input question at a future time. In addition to the results of these determinations, the mechanisms of the illustrative embodiments further make note of the timeframe at which the question was input, e.g., the date/time of the submission of the input question. In some illustrative embodiments, the input question may be correlated with other similar questions and the timeframes of the submissions of the similar questions may be identified as well to assist in the scheduling of the future reminder notifications.

Assuming that the result of the above determinations is that the question/answer combination has some temporal characteristics, the mechanisms of the illustrative embodiments determine an appropriate time to schedule a reminder notification for a future time when the answer is likely more useable by the user. In one illustrative embodiment, the answer to the input questions is output to the user that submitted the input question, via a client machine used by the user for example, along with a request as to whether the user wishes to schedule a future reminder notification of the answer to the input question. If the user selects to not schedule a future reminder, the operation terminates with the output of the answer to the user. If the user selects to schedule a future reminder, the mechanism of the illustrative embodiments determine a best appropriate time in the future to schedule the reminder notification for output to the user and stores a reminder record for use by the cognitive reminder notification system to output a future reminder notification.

In one illustrative embodiment a default timeframe is selected for reminder notification scheduling. The default timeframe is a timeframe prior to the time specified in the answer, at which time the reminder notification will be output to the user. For example, a default timeframe may be one week prior to the timeframe of the answer. Thus, for example, if the answer involves the date August $4^{th}$, then a reminder notification of the answer may be scheduled to be output one week prior to August $4^{th}$. The default timeframe may be an arbitrarily selected timeframe, a timeframe corresponding to a temporal category of the domain associated with the question/answer as determined using the mechanisms of co-pending U.S. patent application Ser. No. 14/297, 335, a default timeframe specified in a user's personal profile, a timeframe determined from timeframes associated with similarly submitted questions, or the like.

Thus, if the user specifies in their user personal profile data structure that they prefer to receive reminder notifications one week before the date associated with the answer of the input question, then this one week default timeframe will be used to schedule a future reminder notification. Similarly, if, through analysis of the content of a domain associated with the question/answer a particular temporal category having a corresponding temporal characteristic is determined, then the temporal characteristic may be utilized as the default timeframe for scheduling the future reminder notification.

Moreover, if the input question is similar to other input questions provided by the same or other users, reminder notification scheduling temporal characteristics associated with the similar questions may be utilized to determine a timeframe for scheduling the reminder notification for the current question. For example, the mean of the reminder notification timeframes of similar questions may be utilized to determine a timeframe for scheduling the reminder notification of the current answer.

In the above illustrative embodiments, the reminder notification timeframe is not tied to specific characteristics of the user and the user's personal association with the answer. To the contrary, the reminder notification is referred to as a "default" timeframe because it is either independent of the user's characteristics or independent of the characteristics of the answer. That is, a default timeframe may be the same for all answers regardless of the domain, lexical answer type, or other specific characteristics of the particular answer, e.g., a default timeframe in the user's profile may specify a one-week timeframe regardless of the domain or characteristics of the answer. A default timeframe may be specified by the analysis of the content of the domain such that all questions/answers associated with a domain may have the same default timeframe specific to that domain, but independent of the particular characteristics of the user and/or answer to the specific question submitted by the user. Moreover, a default timeframe may be determined by analysis of similar questions regardless of the particular characteristics of the user that submitted the current question and/or the answer returned.

In addition to, or in replacement of, these default timeframes for scheduling the reminder notification, the mechanisms of the illustrative embodiments may further analyze the user's personal profile to determine the most appropriate reminder notification timeframe for that particular user. Various characteristics of the user profile, e.g., age of the user, family information, hobbies of the user, medical history of the user, etc. may be analyzed based on their correlation to the concepts in the question/answer. For example, if the user asks the question "When should I start teaching my child to do math?" and the answer may be "at 5 years old." In looking at the question and answer, the mechanisms of the illustrative embodiments may determine that the question and answer has to do with the age of a child. By analyzing the user's profile information it may be determined from relationship or family information that the user has a three year old child whose birthday is Aug. 14, 2011. It may further be determined that for this domain, a default timeframe is approximately two months. As a result, a reminder notification may be scheduled for sending to the user when the user's child will be 4 years and 10 months old, i.e. Jun. 14, 2016.

Moreover, mechanisms are provided for analyzing evidence of the behavior of the user with regard to activities of the user that may be influential on the timeframe for scheduling the reminder notification. For example, tasks may be associated with an answer to the input question. These tasks, or similar tasks, may have been performed by the user in the past, or by other users in the past if the current user has not performed such tasks. Information about such tasks and the performance of such tasks may be obtained from various trusted sources about the user including electronic communications to/from the user via electronic mail, social network websites, newsgroups, instant messaging applications, or any other electronic messaging mechanism. Such information may also be obtained from electronic calendar applications associated with the user's client computing device, electronic "to-do" or notes list data structures, scheduling information and treatment information in medical records associated with the user, project management tool information associated with the user, previous reminder notification scheduling requested by the user for similar tasks, and the like.

The information from the various trusted sources may be analyzed to generate a concept map of the task that breaks the task into one or more sub-tasks to be completed and concepts associated with the task/sub-tasks. Each such sub-task may have an associated temporal aspect to them based on the analyzed information about the user's previous activity. The temporal aspects of the various sub-tasks may be added and/or merged together to generate a cumulative timeframe for the scheduling of the reminder notification. The reminder notification may then be set based on the cumulative timeframe.

It should be appreciated that regardless of which embodiment, or combination of embodiments, implemented, the result is an entry in a cognitive reminder notification database that stores information about the user, including contact information for sending the reminder notification, the question asked, the answer generated, the timeframe used to generate the scheduled reminder notification and the scheduled reminder notification time for the scheduled reminder notification which operates as a trigger for transmitting the reminder notification to the user. Thus, periodically, the cognitive reminder notification system may traverse the currently active reminder notification entries to determine if any of the entries are triggered by the current date/time. If so, the question may be resubmitted to the QA system to determine if the answer to the question has changed or not and thus, a most up-to-date answer is returned as part of the reminder notification. Alternatively, the original answer in the entry may simply be returned without checking for an update to the answer. The reminder notification message may be transmitted to the user utilizing the user's contact information which may comprise any generally known or later developed contact information including electronic mail address, client computing device IP address, instant messaging address, telephone number for text/audio communication, or the like. Once the reminder notification has been sent, the entry in the database may be marked as no longer active at which point it may be overwritten. In some cases, an option may be presented to the user to reschedule the reminder notification in which case the reminder may be postponed to a later time specified by the user, e.g., postpone for 5 days, postpone for 1 month, etc., with the entry in the database having its scheduled reminder notification time updated accordingly.

In some illustrative embodiments, the cognitive reminder notification system of the illustrative embodiments may periodically check all of the active entries in the cognitive reminder notification database to determine if the answers in those entries have changed or not since the original answer was generated. That is, between the time that the answer was generated and provided to the user, and when the reminder notification is sent to the user, e.g., the scheduled reminder notification time, the system may periodically check to see if the answer has changed. This check may comprise resubmitting the original question to the QA system and obtaining a new answer to the question. The new answer may be compared to the original answer to determine if there is a significant change in the answer. If there is a significant change in the answer, then a notification may be sent to the user at that time rather than waiting for the scheduled reminder notification time to be reached. The notification may specify that a change in the answer has occurred and request the user to confirm whether they wish to update the reminder notification for this answer, cancel the original reminder notification, or not make any change to the reminder notification. Based on the user input, the reminder notification timeframe and scheduled reminder notification time may be updated based on analysis of this new answer, the reminder notification as a whole may be marked as no longer active and thus, able to be overwritten, or the original reminder notification may be maintained. In any case, the new answer may be stored in replacement of the original answer and/or in conjunction with the original answer, potentially with corresponding dates/times that the original answer and the new answer were generated. In this way, when a reminder notification is sent to the user, a history of the change in the answer may be output as well indicating what the original answer to the question was, and each of the changes to the answer from the time point of the original answer to the time point of the reminder notification.

Thus, the illustrative embodiments provide mechanisms for automatically scheduling and sending notifications of previously obtained answers to questions based on a cognitively determined future timing of the notification. The future timing of the notification is cognitively determined based on a determined notification timeframe which is dependent upon the particular domain of the question and/or answer, a timeframe inferred from the question and/or answer, and/or other factors associated with the user, other users, similar questions/answers, and the like, as mentioned above and discussed in greater detail hereafter. Between the time that the question was originally submitted to the QA system and the answer obtained, and the time that the notification is scheduled for sending to the user, changes to the answer of the question may be monitor in a continuous, periodic, or event based manner and if a significant change to the answer is determined to have occurred, a notification can be sent to the user automatically. The mechanisms of the illustrative embodiments greatly aid users of QA systems by being able to provide automatic reminder notifications to these users at the most beneficial time for the particular user such that the answers obtained have the most usefulness for the user.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
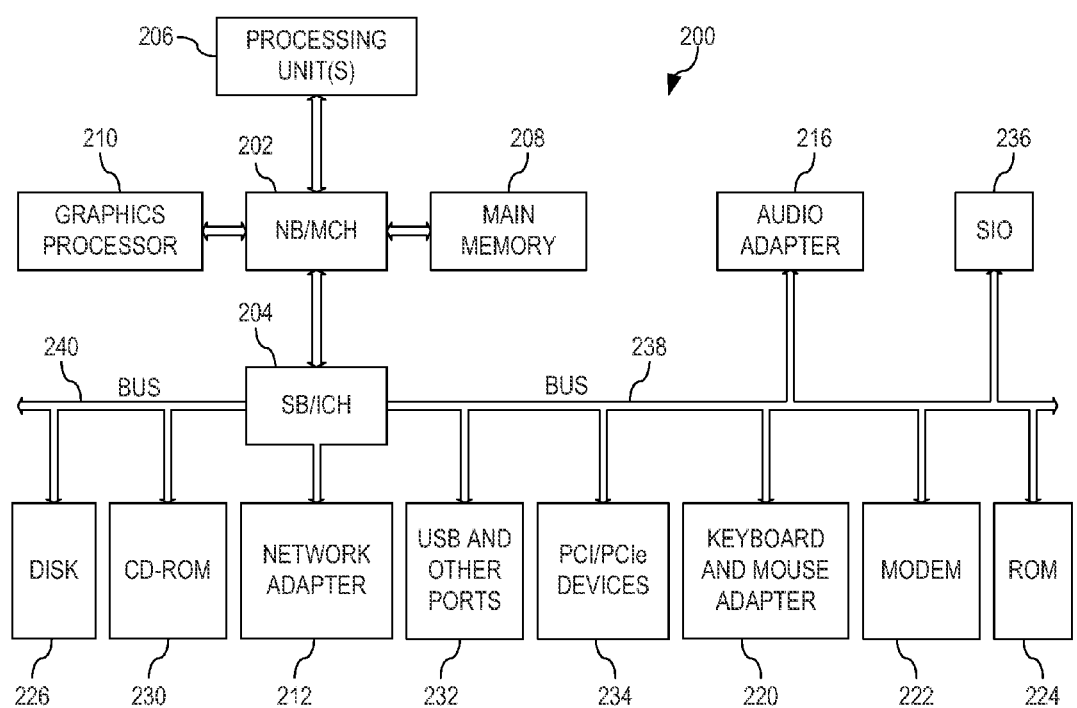
FIG. 2 is a block diagram of an example data processing system in which aspects of the illustrative embodiments are implemented.
Figure 3:
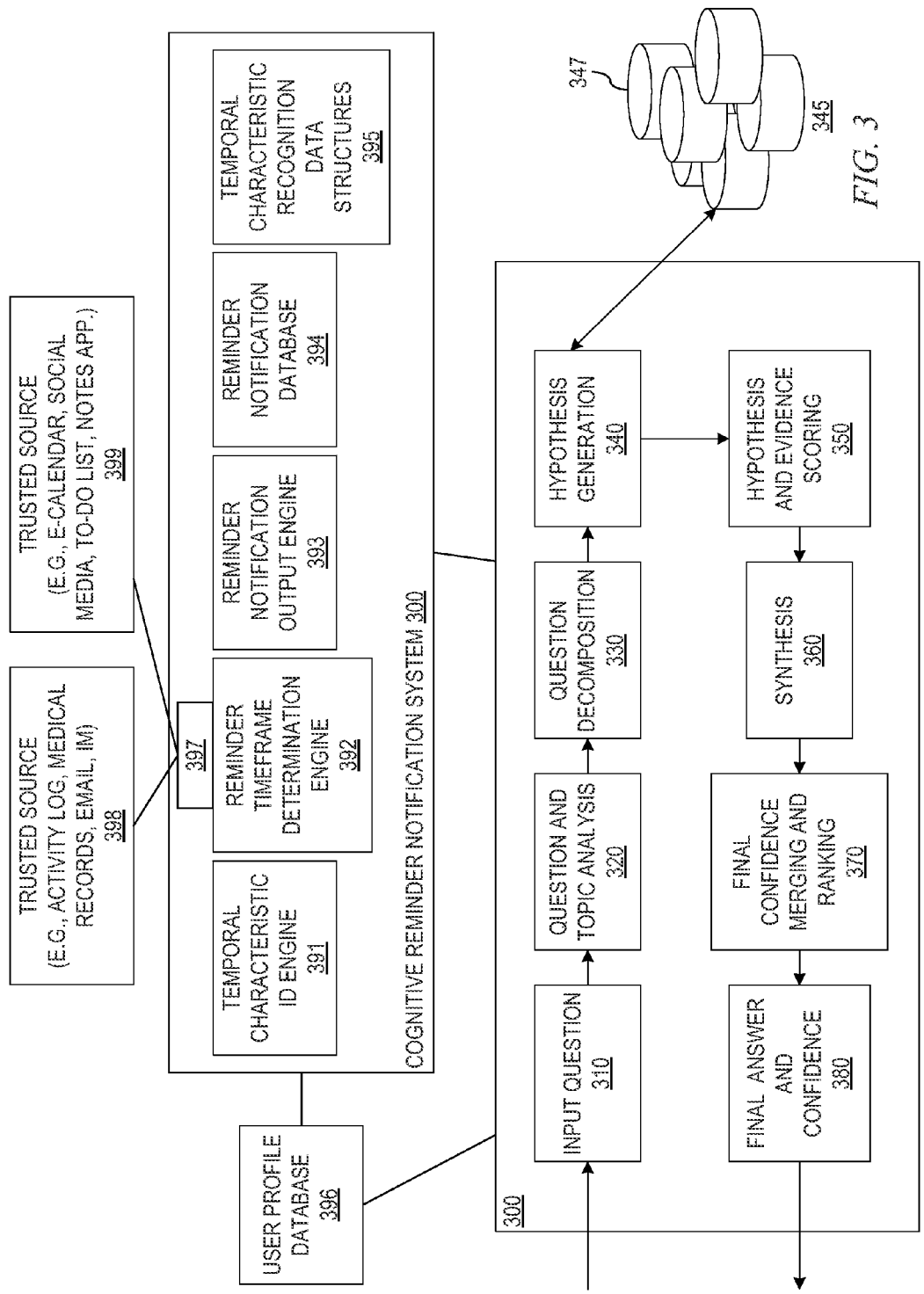
FIG. 3 illustrates a cognitive system QA pipeline for processing an input question with which mechanisms for a cognitive reminder notification system are utilized in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of these QA mechanisms of the cognitive system with regard to providing automatic reminder notifications to users of answers to previously submitted questions as well as providing checks of answers to previous questions to determine if the answers have changed between the time point at which the question was answered and the time point when the answer will be most beneficial to the user.

Thus, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding
Ingest and process vast amounts of structured and unstructured data
Generate and evaluate hypothesis
Weigh and evaluate responses that are based only on relevant evidence
Provide situation-specific advice, insights, and guidance
Improve knowledge and learn with each iteration and interaction through machine learning processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection from data points (images, text, voice) (memorization and recall)
Predict and sense with situational awareness that mimic human cognition based on experiences
Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question. The final answer, or ranked set of answers, may then be returned as the answer(s) to the input question. The returned answer(s) may be output to the original submitter of the input question as a result. In the case of a ranked set of answers, the output of the result may comprise a ranked listing with corresponding scores such that the user is informed of the relative confidence in the various answers returned. Alternatively, the output may comprise only the highest confidence (highest ranking) answer as the final answer to the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a cognitive reminder notification system 120. The cognitive reminder notification system 120 comprises temporal characteristic identification logic 122, reminder timeframe determination logic 124, reminder notification output logic 126, and reminder notification database 128.

When a user of a client computing device 110, for example, asks a question of the cognitive system 100, the QA pipeline 108 processes the question and generates an answer to the question which is output to the user's client computing device 110. In the generation of the answer to the question, the temporal characteristic identification logic 122 may operate on the question and answer to determine if the question/answer combination includes a temporal characteristics indicative of a potential need for scheduling a future reminder notification. If so, a user interface is output to the user's client computing device 110 to not only present the answer generated for the question, but an option for the user to indicate whether the user would like to have a reminder notification scheduled for a future time at which the answer will be more useful or beneficial for the user. In some illustrative embodiments, the user interface may further include a field or selectable options by which the user may specify a desired timeframe for scheduling the reminder notification.

Assuming the user has opted for scheduling a reminder notification, and the user has not specified a desired timeframe for the scheduling of the reminder notification, the reminder timeframe determination logic 124 operates on the question, the answer, information about the user and the user's previous activity, information about the domain of the question/answer, information about similar questions/answers, information about similar users and their previous activity, and/or the like to determine a most likely beneficial time for scheduling the future reminder notification for presenting this answer to the user again. The various ways in which the reminder timeframe is calculated will be described in greater detail hereafter with reference to various illustrative embodiments. Information about the user, e.g., user contact information, the question, the answer, and the determined timeframe are stored in an entry in the reminder notification database 128.

Continuously, periodically, or on an event-basis, the reminder notification output logic 126 may traverse the entries in the database 128 to identify active entries in the database 128. Active entries in the database 128 may have their answers checked to determine if there is a significant change in the answer since the time when the original answer was presented, or the last update to the answer was generated. This check may comprise resubmitting the original question to the QA pipeline 108, obtaining a new answer to the original question, and determining if there is a significant change in the new answer when compared to the original, or previously updated, answer. If there has been a substantial change, then a notification may be sent to the user associated with the entry requesting input from the user as to how they wish to handle the change in the answer, e.g., update the reminder notification, cancel the reminder notification, or make no change.

Continuously, periodically, or on an event-basis, the reminder notification output logic 126 may also traverse the database 128 to identify the active entries and determine if the timeframes for the scheduled reminder notifications are met by the current date/time such that sending of the reminder notification associated with the entry is triggered. If the sending of a reminder notification for an active entry is triggered, then the reminder notification output logic 126 may generate and output a reminder notification to the user indicating the original question and the answer(s) to the original question. In the case where the answer may have changed over the time period from the time that the original answer was generated and when the reminder notification is sent, a historical listing of the changes to the answer may be output as part of this reminder notification, including the various answers and their corresponding date/time information indicating when the change was detected by the cognitive system 100.

In response to the reminder notification, the user may elect to postpone the reminder notification for a specified period of time in which case the reminder notification entry in the database 128 may be updated to reflect the postponement of the reminder notification and the entry remains active. If postponement is not indicated by the user, then the entry in the database 128 is marked as no longer active such that it may be overwritten.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a cognitive system QA pipeline, of a cognitive system, for processing an input question in accordance with one illustrative embodiment. The cognitive system QA pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the QA pipeline 300 may be provided for interfacing with the QA pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the QA pipeline 300 is associated with a cognitive reminder notification system 390 that comprises a temporal characteristic identification engine 391, reminder timeframe determination engine 392, reminder notification output engine 393, reminder notification database 394, and temporal characteristics recognition data structures 395. These elements may operate in conjunction with a user profile database 396 which may be part of the cognitive reminder notification system 390 or otherwise provided as part of the cognitive system in which the QA pipeline 300 is provided (as shown). The user profile database 396 may store personal information about registered users of the cognitive system and QA pipeline 300 including various demographic information, family/friend information, contact information, and the like, as may be obtained through a registration process, for example. Alternatively, the user profile database 396 may be compiled from various other systems, such as one or more social networking websites, one or more instant messaging systems, online forums and/or newsgroups, or any other source that may have registered user information that may be accessed by the cognitive system.

The cognitive reminder notification system 390 monitors the processing of questions by the QA pipeline 300 to determine if the question submitted to the QA pipeline 300, the answer generated by the QA pipeline for an input question, or both have temporal characteristics indicative of a possible need to schedule a future reminder notification. Natural language processing of the question may be performed to determine if the question itself mentions a temporal characteristic, e.g., through keyword, key phrase, concept identification, or any other known or later developed natural language processing technique for extracting features from the input question.

For example, the temporal characteristic identification engine 391 of the cognitive reminder notification system 390 may interface with the question and topic analysis stage 320 of the QA pipeline 300 which may be augmented to include logic that identifies and extracts major features associated with temporal characteristics explicitly specified in the input question, if not already configured to do so. For example, the question may specifically indicate that the answer sought is a "day" or a "month", or a "time of day", or a "year", e.g., "What day in September is Labor Day?" or "What month has the highest flu incidents?" or "What time of day should I take my Prednisone pill?" In such examples, keywords such as "day", "month", and key phrases such as "time of day" are indicative of an explicitly specified temporal characteristic in the question itself. Thus, the processing of the input question to extract major features as already performed by the QA pipeline 300 may be leveraged to assist in determining whether to schedule a reminder notification for the answer generated by the QA pipeline 300.

In addition, the extraction of major features during stage 320 may also be augmented with logic to extract major features of the input question indicative of an aspect of time that is not an explicit specification of a particular time characteristic. An aspect of time differs from an explicitly specified temporal characteristic in that it is not clear from the question itself what type of date/time answer is being sought although it is clear that an answer having a temporal characteristic is being sought. For example, keywords such as "when" and "time" are keywords that are indicative of an aspect of time being sought in the answer to the input question, but without specifying a particular type of time aspect (temporal characteristic), e.g., day, month, year, time of day, etc. For example, questions such as "When does it snow in NY?" and "What is the best time to go skiing in Colorado?" are questions that reference aspects of time but without explicitly stating the type of temporal characteristic being sought since the answer may be a date, a day, a month, a time of the day, a range of dates, a combination of two or more of these, or any other temporal characteristic.

Aspects of time may further be dependent upon particular associations of keywords and phrases with temporal concepts, such as seasons, times of day, months, years, etc. For example, the keyword "skiing" may be associated with "winter" which in turn may be associated with particular months of the year, e.g., November to March. The keyword "skiing" may also be associated with a season, such as a ski season, similar to the way "deer hunting" may be associated with a "hunting season." Moreover, location information in the question may be informative as to the temporal characteristic in the answer, e.g., winter in Colorado may comprise different months of the year than winter in Toledo, Spain.

The logic of stage 320 and/or the logic of the temporal characteristic identification engine 391 may be configured to identify these temporal characteristics and aspects in the input question. The keywords, key phrases, and concepts that specifically identify a temporal characteristic in the input question may be specified in one or more of the temporal characteristics recognition data structures 395. The temporal characteristics recognition data structures 395 may further store associations of keywords, key phrases, concepts, and the like to one another and to specific temporal characteristics such that they may be used to identify aspects of time in the input question and map those aspects of time to particular types of temporal characteristics.

Thus, with the mechanisms of the illustrative embodiments, the temporal characteristic identification engine 391 analyzes the keywords, key phrases, concepts, and other major features extracted from the input question by stage 320 of the QA pipeline 300 to thereby identify temporal characteristics of the input question. The identification of the temporal characteristics is performed using natural language processing techniques that operate on the input question to identify time based keywords or phrases, relationships associated with time in the language of the input question, or the like. In addition to analyzing the question to determine if it specifically identifies a temporal characteristic, the mechanisms of the illustrative embodiments may further analyze the question to determine if, while not explicitly specifying a temporal characteristic, the question contains some aspect of time that will be reflected in the answer. These aspects of time may further be identified via known relationships between keywords or key phrases and various other keywords, key phrases, or concepts. In either case, the specific temporal characteristics in the input question or the aspects of time are used to generate an association of temporal characteristics with the input question which may be used to identify the possibility of a need to schedule a future reminder notification.

In addition to analyzing the input question to identify such temporal characteristics of the input question, the temporal characteristic identification engine 391 may also analyze the resulting answer to determine if the resulting answer has any temporal characteristics present. That is, there may be cases where the input question does not itself have temporal characteristics identified as being associated with the input question yet the answer to the input question may have one or more temporal characteristics associated with it. Thus, it may be beneficial to analyze both the input question and the answer to determine if temporal characteristics are present. In addition, it is necessary to analyze the answer to the input question to identify the temporal characteristics present so as to determine when to schedule a future reminder notification if needed, as discussed hereafter.

The temporal characteristics of the answer to the input question may be determined in a similar manner by analyzing keywords, key phrases, and concepts in the answer that is generated by the QA pipeline 300 and/or analyzing the answer for timing aspects. Moreover, the lexical answer type (LAT) of the answer may be analyzed to determine the type of answer provided and whether that type of answer corresponds to a timeframe type, e.g., a LAT indicative of a year, date, time, season, or the like. The temporal characteristics identification engine 391 may utilize similar logic as discussed above, and similar keywords, key phrases, concepts, associations of these, and the like, as specified in the temporal characteristics recognition data structures 395, to identify such temporal characteristics in the answer to the input question. Thus, through the analysis of the input question and the answer to the input question generated by the QA pipeline 300, the temporal characteristics identification engine 391 identifies whether or not the input question and/or answer comprise one or more temporal characteristics indicative of a possible need for scheduling a further reminder notification of the answer to the input question.

As mentioned above, one mechanism that may be employed to assist in the analysis of the input question and the resulting answer is described in commonly owned and co-pending U.S. patent application Ser. No. 14/297,335, entitled "Determining Temporal Categories for a Domain of Content for Natural Language Processing," filed Jun. 5, 2014, and which is hereby incorporated by reference. The mechanisms described in this co-pending patent application may be applied to a question and/or answer to determine temporal characteristics of the question and/or answer. Moreover, the mechanisms of the co-pending application may be used to determine a temporal characteristic of the domain associated with an input question and this temporal characteristic may be utilized when determining the scheduling of a future reminder notification as described hereafter.

In addition to determining whether or not the input question and/or answer have associated temporal characteristics that may be indicative of a need to schedule a future reminder notification, the mechanisms of the illustrative embodiments further make note of the timeframe at which the question was input, e.g., the date/time of the submission of the input question. In some illustrative embodiments, the input question may be correlated with other similar questions and the timeframes of the submissions of the similar questions may be identified as well to assist in the scheduling of the future reminder notifications. That is, similar questions submitted at approximately a similar timeframe as the current question may have had reminder notifications scheduled for these similar questions and thus, may be representative of the particular timespan that should be used for scheduling a reminder notification for the current question. Alternatively, similar questions that were submitted at different timeframes from the current question may still be utilized with the timespans for the reminder notifications of these similar questions being determined based on the timeframes of their submission and subsequent scheduling of the reminder notification for those questions. Moreover, the timeframe of the submission of the input question is a base timeframe from which the reminder notification is scheduled in the manner described hereafter.

Assuming that at least one temporal characteristic is identified, in one or more of the input question or the answer to the input question, the temporal characteristic(s) may be analyzed to determine if the answer is associated with a future timeframe, e.g., date/time/season/year, from the current timeframe. For example, the temporal characteristics of the answer may be compared to the timeframe of the submission of the input question to determine whether the temporal characteristics of the answer are at a timeframe in the future compared to the timeframe of the submission of the input question. For example, if the question "When should I plant my rose bushes?" is submitted in August and the answer is returned by the QA system may be "late February to early April." Thus, the answer is for a timeframe that is at least 6 months in the future. Therefore, it may be determined that there is a potential need for the scheduling of a reminder notification for the answer to the input question.

In response to a determination that the answer comprises a temporal characteristic directed to a future timeframe compared to the timeframe of the submission of the input question, the user may be presented with a user interface that outputs the answer to the input question and an option to schedule a future reminder notification to be sent to the user when the answer to the question is within a timeframe that the answer becomes more immediately useable by the user. Alternatively, this reminder notification may be automatically generated and stored for the user. The scheduling of the reminder notification may take a variety of forms.

In response to a user input requesting the scheduling of a reminder notification, or in response to initiating an automatic operation for generating a reminder notification, the reminder timeframe determination engine 392 determines the best time to notify the user of the answer to their previously submitted question. The reminder timeframe determination engine 392 determines a date/time to schedule the reminder notification based on temporal characteristics of the answer, temporal characteristics of the question, and temporal characteristics associated with the user that submitted the input question. Based on a combination of these various temporal characteristics, the cognitive reminder notification mechanisms of the illustrative embodiments determine a best time to schedule the future reminder notification for output to the user.

In one illustrative embodiment, the reminder timeframe determination engine 392 selects a default timeframe, or timespan, for reminder notification scheduling. The default timeframe is a timeframe prior to the time specified in the answer, at which time the reminder notification will be output to the user. A time span is a time from the submission time of the input question to a time at which the reminder notification is scheduled for output to the user. For example, a default timeframe may be one week prior to the timeframe of the answer. Thus, for example, if the answer involves the date August $4^{th}$, then a reminder notification of the answer may be scheduled to be output one week prior to August $4^{th}$. The default timeframe may be an arbitrarily selected user independent timeframe that the reminder timeframe determination engine 392 is pre-configured with, a timeframe associated with the user as specified, for example, in a user profile data structure of the user profile database 396, a timeframe corresponding to a temporal category of the domain associated with the question/answer as determined using the mechanisms of co-pending U.S. patent application Ser. No. 14/297,335, a timeframe determined from timeframes associated with similarly submitted questions, or the like.

Thus, for example, the reminder timeframe determination engine 392 may comprise a configuration data structure that defines for the reminder timeframe determination engine one or more configuration parameters that govern the operation of the reminder timeframe determination engine 392. One of these configuration parameters may comprise a default timeframe for scheduling reminder notifications, where this default timeframe is independent of the particular users, the domain of the question, and/or the concepts in the question/answer. In some cases, multiple default timeframes may be pre-configured in the reminder timeframe determination engine 392, e.g., one default timeframe for each domain that the cognitive system or QA pipeline 300 operates on. This default timeframe may be subtracted from the temporal characteristic of the answer, or another function of the default timeframe may be utilized without departing from the spirit and scope of the present invention, such that a date/time for sending the reminder notification is generated.

Alternatively, or in addition, if the user specifies in their user personal profile data structure in the database 396 a default timeframe, e.g., a default that they prefer to receive reminder notifications one week before the date associated with the answer of the input question, then this one week default timeframe will be used to schedule a future reminder notification, regardless of the temporal characteristic type of the answer. Similarly, if, through analysis of the content of a domain associated with the question/answer, such as via the mechanisms of the co-pending U.S. patent application Ser. No. 14/297,335 or other domain analysis mechanism, a particular temporal category having a corresponding default timeframe is determined, then the default timeframe of the domain may be utilized as the default timeframe for scheduling the future reminder notification.

Moreover, if the input question is similar to other input questions provided by the same or other users, reminder notification scheduling timeframes associated with the similar questions may be utilized to determine a default timeframe for scheduling the reminder notification for the current question. For example, the mean of the reminder notification timeframes of similar questions may be utilized to determine a default timeframe for scheduling the reminder notification of the current answer. Many mechanisms exist for identifying similar questions including mechanisms that operate based on keyword matching, clustering of extracted features of questions, and the like. Any known or later developed mechanism for identifying similar questions may be utilized and, having identified one or more similar questions, the mechanisms of the illustrative embodiments may look up in the reminder notification database 394 the corresponding timeframes used to generate the reminder notifications for these similar questions, e.g., a difference between a timestamp associated with the original input question and the date/time of the reminder notification or a difference between the temporal characteristic in the answer and a date/time of the reminder notification, for example. The average, mean, or any other statistical or mathematical function of the reminder notification timeframes may be utilized to generate a default timeframe for the reminder notification of the current question/answer.

It should be appreciated that any combination of the above methods of defining a default timeframe for the reminder notification of the current question/answer may be utilized without departing from the spirit and scope of the illustrative embodiments. For example, a prioritization of methods for defining a default timeframe for the reminder notification may be utilized or a function combining two or more of these methods may also be utilized. For example, a user specified timeframe may have a higher priority that a pre-configured user independent default timeframe. A timeframe calculated form similar questions may be given a higher priority than a pre-configured user independent default timeframe but may have a lower priority than a priority of a user specified timeframe, or in some illustrative embodiments may have a relatively higher priority than the user specified timeframe. A timeframe calculated based on analysis of the domain may also be prioritized relative to the other methods of calculating a default timeframe in a similar manner. Alternatively, various weights may be associated with the different sources of timeframes and a weighted function of a combination of these timeframes may be used to calculate a timeframe for scheduling the reminder notification for the current question/answer. Any combination of these methods, or prioritization of these methods, may be used without departing from the spirit and scope of the illustrative embodiments.

In addition to, or in replacement of, these default timeframes for scheduling the reminder notification, the reminder timeframe determination engine 392 may further analyze the user's personal profile data structure, in the database 396 for example, to determine the most appropriate reminder notification timeframe for that particular user. Various characteristics of the user profile, e.g., age of the user, family information, hobbies of the user, medical history of the user, etc. may be analyzed based on their correlation to the concepts in the question/answer. For example, if the user asks the question "When should I start teaching my child to do math?" and the answer may be "at 5 years old." In looking at the question and answer, the mechanisms of the illustrative embodiments may determine that the question and answer has to do with the age of a child. By analyzing the user's profile information it may be determined from relationship or family information that the user has a three year old child whose birthday is Aug. 14, 2011. It may further be determined that for this domain, a default timeframe is approximately two months. As a result, a reminder notification may be scheduled for sending to the user when the user's child will be 4 years and 10 months old, i.e. Jun. 14, 2016.

As another example, the user may ask a question about vacationing in Washington D.C. and specifically about traveling to Washington D.C. by automobile. If a reminder notification is to be set for the user, the user's current home location may be compared to the geographic location of Washington D.C. to calculate a geographical/road distance that the user would have to travel in order to travel from their home location to Washington D.C. and an estimate of travel time may be generated based on a predetermined expected travel speed, or posted speeds along a specified route (e.g., most direct route) from the home location to the Washington D.C., and the calculated geographical/road distance. From the results of this travel time calculation, and an answer specifying a temporal characteristic as to when the user is likely to want to arrive in Washington D.C., a reminder notification may be scheduled for a date/time prior to the desired arrival at Washington D C taking into account the travel time, e.g., if the travel time is 4 days, and the user wishes to be reminded 3 weeks before the time that the vacation should commence, then the reminder notification may be set for 3 weeks and 4 days prior to the date on which the user wishes to arrive in Washington, D.C.

It can be appreciated from the examples above, that there are many different types of evaluations that may be made based on the information stored in the user profile data structure of the database 396 depending upon the particular concepts in the question/answer. The reminder timeframe determination engine 392 is configured with logic to identify various relationships between concepts in the question/answer and information in the user profile data structures so as to make determinations as to the best time to schedule a reminder notification. Again, this may take into account priorities and specific requests by the user for particular timeframes for the reminder notifications as well, as previously discussed above.

Moreover, the reminder timeframe determination engine 392 comprises logic for analyzing evidence of the behavior of the user with regard to activities of the user that may be influential on the timeframe for scheduling the reminder notification. For example, tasks may be associated with an answer to the input question. These tasks, or similar tasks, may have been performed by the user in the past, or by other users in the past if the current user has not performed such tasks. Information about such tasks and the performance of such tasks may be obtained from various trusted sources 398-399 associated with the user. There may be a predetermined set of trusted sources 398-399 with which the mechanisms of the illustrative embodiments have established interfaces 397 for accessing information about user activities and personal profile information. The information regarding the user's previous activities, actions, performance of tasks, and the like, may be obtained from various sources including analysis of electronic communications to/from the user via electronic mail, postings to social network websites, postings to newsgroups, instant messages passed via an instant messaging application, analysis of medical records, criminal records, activity logs, or any other electronic messaging mechanism or source of electronic content representative of user activity. Such information may also be obtained from electronic calendar applications associated with the user's client computing device, electronic to-do or notes list data structures, scheduling information and treatment information in medical records associated with the user, project management tool information associated with the user, previous reminder notification schedules requested by the user for similar tasks, and the like.

The reminder timeframe determination engine 392 comprises logic and one or more interfaces 397 for accessing these trusted sources 398-399 of information about the user's previous activities, and/or other users' previous activities with regard to similar tasks, so as to obtain this information from the various trusted sources for analysis. For example, the user may ask a question regarding when is a good time to have the user's child administered the chicken pox vaccine. The answer returned may be of the type "when the child is 12 to 15 months old." Looking at the user's personal information in the user's personal profile, it may be determined that the user is the parent of a 6 month old baby. Thus, the answer to the original question is not of great use to the user for another 6 to 9 months away and therefore, a reminder notification may need to be scheduled for the user. Assuming the user requests such a reminder notification, or the system automatically initiates the generation of such a reminder notification, the scheduled timing for the reminder notification is determined by the reminder timeframe determination engine 392. The reminder notification may initially be scheduled based on a default timeframe determined from one or more of a user and answer independent default timeframe, a default timeframe specified by the user, and/or a default timeframe determined based on analysis of the domain and/or prior scheduling of reminder notifications for similar questions, as discussed above.

Moreover, the user's personal information may be analyzed to determine their geographical home location and how close it may be to a hospital or clinic so as to determine how long it will take for the user to travel to the particular location that is most likely to provide the vaccine. Furthermore, the reminder timeframe determination engine 392 may access the user's medical records to analyze a historical timeline of treatment recommendations, appointments, treatments administered, and the like, to determine approximately how long it takes the user to obtain a recommended treatment after the treatment has been recommended. For example, if the user's medical records indicate the user is often recommended to obtain treatments but then waits at least 2 weeks to schedule the appointment to obtain the treatment, then this is indicative of the user's need for at least 2 weeks to schedule an appointment to obtain treatment. Moreover, information about the user's doctor availability may be obtained from the medical records to determine how far out the doctor is scheduling appointments, i.e. how "booked" the doctor is. These factors may be combined to determine that, for example, a 3 week time period is needed prior to the date that the vaccine is to be administered, for the reminder notification to be scheduled. This timeframe may be compared to the default timeframe and the timeframe providing the most or least, depending upon the desired implementation, time separation from the desired time of the administering of the vaccine (at 12 months old for example) may be selected. Thus, for example, if the default timeframe is 2 weeks, and the implementation selects a timeframe providing the most time separation from the answer's temporal characteristic, then a 3 week time period will be selected and used to schedule a reminder notification 3 weeks prior to the user's child becoming 12 months old.

As mentioned above, the answer to a question may be associated with a task, which may in turn be broken down into sub-tasks. The association of the concepts in the answer may be correlated to such tasks and sub-tasks using various sources that indicate the tasks/sub-tasks associated with particular concepts. Each task and/or sub-task may be evaluated based on the user's prior history of activity to determine for each task/sub-task how much time it takes the user to complete the task/sub-task, such that the cumulative amount of time is indicative of an amount of time prior to an answer's temporal characteristic the user requires to achieve the task associated with the answer. That is, the answer to the input question may be analyzed to generate a concept map of the task that breaks the task into one or more sub-tasks to be completed. Each such sub-task may have an associated temporal aspect based on the analyzed information about the user's previous activity. The temporal aspects of the various sub-tasks may be added/merged together to generate a cumulative timeframe for the scheduling of the reminder notification. The reminder notification may then be set based on the cumulative timeframe.

Thus, for example, if the answer is about traveling to Walt Disney World™ in Orlando, Fla. for vacation, there may be multiple sub-tasks required to achieve this task associated with the answer to the question, including purchasing airplane tickets, obtaining hotel reservations, obtaining amusement park tickets, traveling to the location, etc. A mapping of these tasks/sub-tasks may be obtained by analyzing the concepts in the answer and associating with each concept a corresponding task/sub-task. For each such task/sub-task, a corresponding timeframe may be calculated as discussed above and the timeframes added to obtain the total amount of time that it is expected that the user will require to achieve the overall task associated with the answer to the question. This timeframe may then be used as a basis for scheduling a reminder notification prior to the expected initiation time of the task, i.e. the temporal characteristic of the answer to the question.

Thus, in addition to generating a default timeframe and analyzing the user's profile information to obtain a user specific timeframe, a further user specific timeframe may be generated based on analysis of the user's prior activities regarding similar tasks associated with the answer to the question. For example, if the user has performed the activity previously, then the user's past calendar entries, "to-do" lists and other data structures may be utilized to generate estimates of the time required to accomplish the corresponding task/sub-task. Moreover, information from such data structures of other similar users may be utilized to obtain data for estimating times required to accomplish tasks/sub-tasks, such as via social networking service or the like.

It should be appreciated that regardless of which embodiment, or combination of embodiments, implemented, the result is an entry in the reminder notification database 394 that stores information about the user, including contact information for sending the reminder notification, the question asked (including the original question, a timestamp associated with the submission of the question, and the like), the answer generated (including the actual answer generated, the confidence measure associated with the answer, and/or additional information about the answer), and the timeframe for the scheduled reminder notification which operates as a trigger for transmitting the reminder notification to the user, e.g. the applicable timeframe and the date/time at which the reminder notification is to be sent to the user based on this applicable timeframe. Additional information about the question/answer and reminder notification that may be deemed useful for performing processing of reminder notifications may also be stored in the entry of the database 394 depending upon the particular implementation chosen. For example, as mentioned above and discussed hereafter, the entry may store a history of changes to the answer based on periodic checking for updates to the answer during the time period between the timestamp of the original submission of the question and the subsequent sending of a reminder notification. Moreover information about any postponement of the reminder notification may also be stored in the entry. Additionally, a bit may be associated with the entry for indicating whether the entry is currently active or inactive such that it may be overwritten.

The reminder notification output engine 393 operates to traverse the entries in the reminder notification database 394 to identify active entries, determine which, if any, of the active entries have had their reminder notification triggered, and determine for those active entries that have not had their reminder notification trigger, whether the current answer in the entry has been updated or not. The reminder notification output engine 393 may operate continuously, periodically, or in response to the occurrence of an event. Continuous operation means that the reminder notification output engine 393 continuously traverses the reminder notification database 394 checking active entries for triggering of their reminder notifications, checking for answer changes, and inactivating entries that have had their reminder notifications activated and which have not received a response from the user to postpone the reminder notification. Periodic operation involves a schedule by which the reminder notification output engine 393 periodically initiates its operation to check the entries of the reminder notification database, check to see if reminder notifications have been triggered, check for updated answers, and inactivate entries. Event based operation involves certain predefined events, such as an administrator initiating the operation of the reminder notification output engine 393, a change in a corpus used to generate the answers to input questions, or the like, being the trigger for initiating the operations of the reminder notification output engine 393.

As mentioned above, the reminder output engine 393 has two primary operations that it performs. The first primary operation is to check the entries of the reminder notification database 394, identify active entries in the database 394, and determine if the active entries have had their reminder notifications triggered or not. A reminder notification is triggered if the current date/time is equal to or past the reminder notification date/time. If the current date/time is equal to or past the reminder notification date/time, and thus, the reminder notification is triggered, the reminder notification output engine 393 generates and outputs a reminder notification to the user specified in the entry, via the user contact information. The reminder notification preferably includes an indication of the original question submitted by the user, the answer to the question, and optionally a user selectable option to postpone the reminder notification to a later time. In some illustrative embodiments, if the answer has been updated since the question was originally submitted and answered, a history of changes to the answer may be provided in the reminder notification along with timestamp information associated with the original answer and each subsequent change to the answer.

In some illustrative embodiments, prior to sending the response notification to the user, the original question may be resubmitted to the QA pipeline 300 to determine if the answer to the question has changed or not and thus, a most up-to-date answer is returned as part of the reminder notification. The reminder notification message may be transmitted to the user utilizing the user's contact information which may comprise any generally known or later developed contact information including electronic mail address, client computing device IP address, instant messaging address, telephone number for text/audio communication, or the like. Once the reminder notification has been sent, the entry in the database 394 may be marked as no longer active, such as by setting the active bit to a non-active state value, at which point it may be overwritten.

As mentioned above, one aspect of the reminder notification may be an option to postpone the reminder notification to a later time. The option may specify predetermined postponement time periods or allow the user to specify an amount of time to postpone the reminder notification, e.g., postpone for 5 days, postpone for 1 month, etc., with the entry in the database having its reminder notification timeframe updated accordingly. In such a situation, the postponement of the reminder notification nullifies the operation to set the entry to an inactive state and thus, the entry remains active. A timeout period may be observed for determining whether the user responds with a postponement request by selecting the option in the reminder notification such that if a postponement request is not received within the timeout period, then the entry will be set to an inactive state.

As a second primary operation, the reminder output engine 393 continuously, periodically, or in response to the occurrence of an event, checks each of the active entries in the cognitive reminder notification database 394 to determine whether or not the most recent answer corresponding to the entry has changed. In some cases this may be a check to determine if the original answer has changed, assuming no other changes have occurred prior to the current check. In other cases, if there has already been a change to the answer since the original answer was generated by the QA pipeline 300, then the check is to see whether or not the most recent prior answer has changed since the last check of the answer.

That is, between the time that the original answer was generated and provided to the user, and when the reminder notification is sent to the user according to the scheduled reminder notification timeframe, the reminder output engine 393 may perform checks to see if the answer has changed. This check may comprise resubmitting the original question to the QA pipeline 300 and obtaining a new answer to the question. The new answer may be compared to the original answer, or a most recently obtained answer for the same question from a prior submission of the question to the QA pipeline 300, to determine if there is a significant change in the answer. A determination as to whether a change is significant or not may be performed in various ways including, but not limited to, performing a character string comparison of the answers to determine if an amount of difference in the character strings is greater than a threshold, comparing numerical values in the answer to determine if a difference in numerical values is greater than a threshold, comparing concepts in the answers to determine if different concepts are being referenced in the answer, or the like. One mechanism that may be utilized in the illustrative embodiments to determine whether an answer to a question has changed is described in commonly owned and co-pending U.S. patent application Ser. No. 14/446,113 entitled "Changed Answer Notification in a Question and Answer System," filed Jul. 29, 2014, which is hereby incorporated by reference.

If there is a significant change in the answer to the question, then a notification may be sent to the user at that time rather than waiting for the reminder notification timeframe to be reached. The notification may specify that a change in the answer has occurred and request the user to confirm whether they wish to update the reminder notification for this answer, cancel the original reminder notification, or not make any change to the reminder notification. Based on the user input, the reminder notification timeframe may be updated based on analysis of this new answer, such as may be performed by the reminder timeframe determination engine 392 in the manner previously described above, the reminder notification as a whole may be marked as no longer active and thus, able to be overwritten, or the original reminder notification may be maintained. In any case, the new answer may be stored in replacement of the original answer and/or in conjunction with the original answer, potentially with corresponding dates/times that the original answer and the new answer were generated, in the entry for the reminder notification in the database 394. In this way, when a reminder notification is sent to the user, a history of the change in the answer may be output by the reminder output engine 393 as part of the reminder notification, thereby indicating what the original answer to the question was and each of the changes to the answer from the time point of the original answer to the time point of the reminder notification.

Figure 4A:
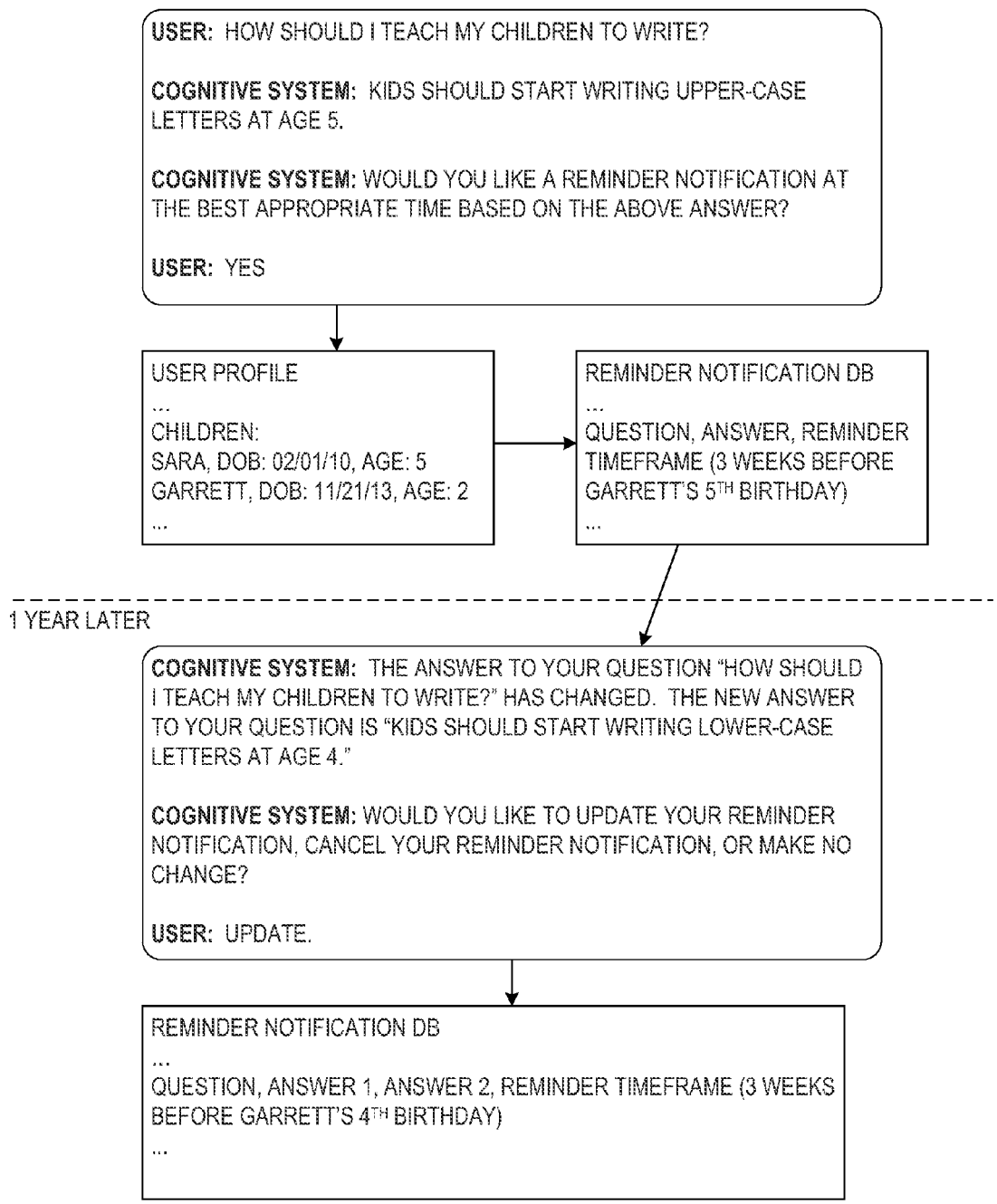
FIG. 4A illustrates an example scenario in which an answer to a question has been generated with a subsequent change to the answer being detected prior to the reminder notification being triggered in accordance with one illustrative embodiment.
Figure 4B:
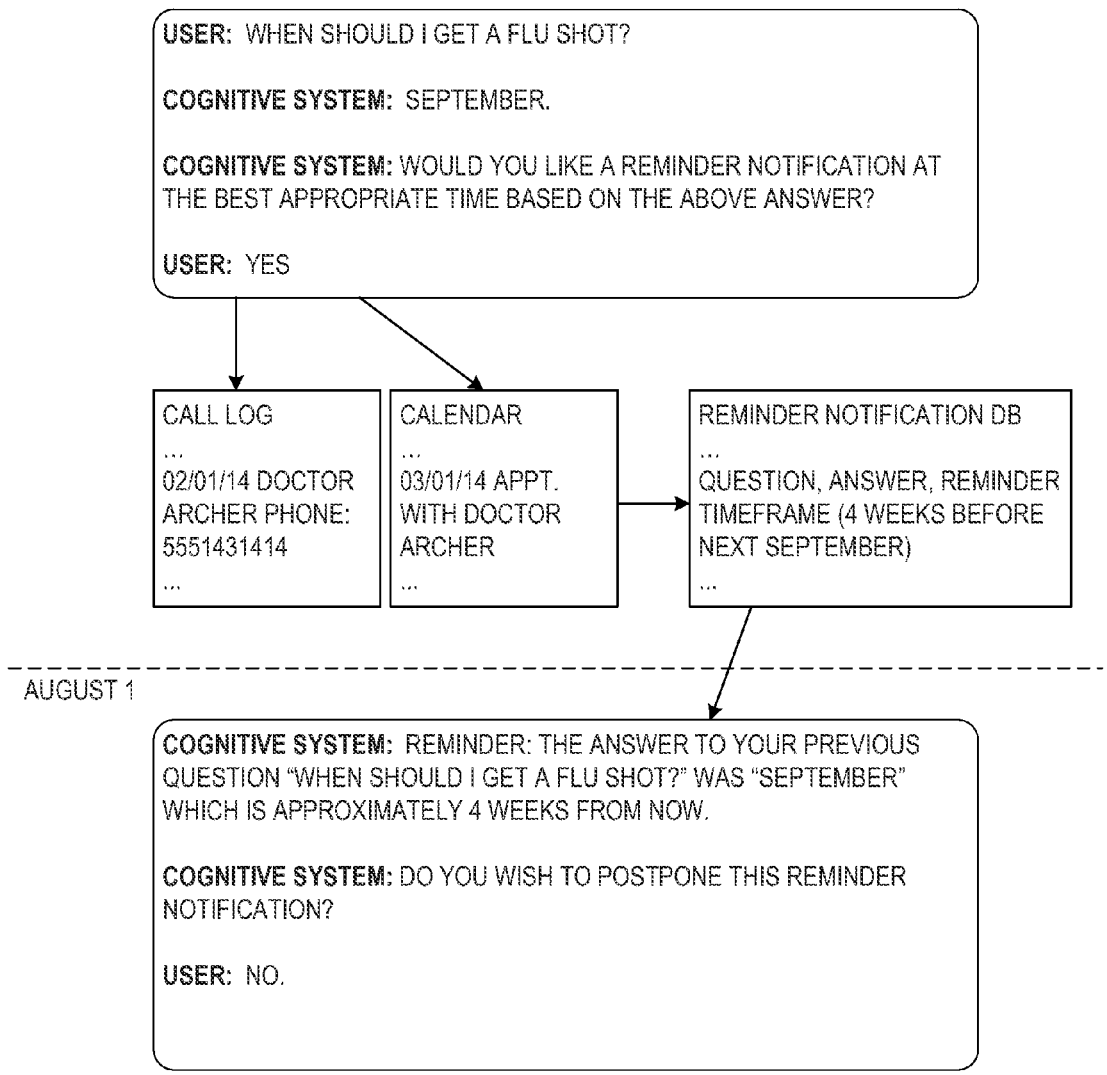
FIG. 4B illustrates an example scenario in which previous user history of activity is used to calculate a reminder notification timeframe in accordance with one illustrative embodiment.
Figure 4C:
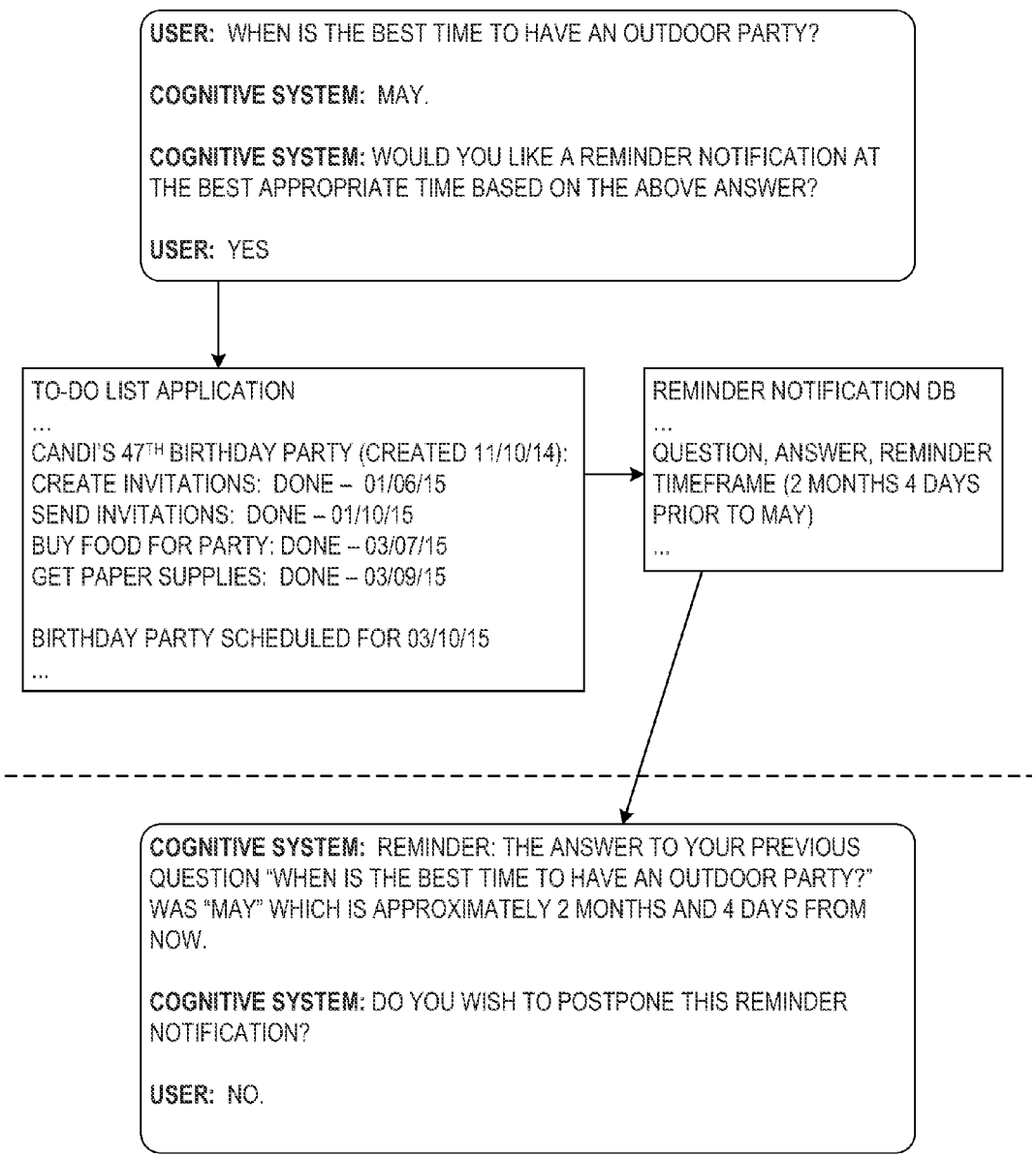
FIG. 4C illustrates an example scenario in which previous user history of activity as well as breaking down a task into sub-tasks is utilized to calculate a reminder notification timeframe in accordance with one illustrative embodiment.

FIGS. 4A-4C illustrate example scenarios of questions and answers with corresponding answer reminder notifications in accordance with various illustrative embodiments. FIG. 4A illustrates an example scenario in which an answer to a question has been generated with a subsequent change to the answer being detected prior to the reminder notification being triggered in accordance with one illustrative embodiment. As shown in FIG. 4A, a user first submits a question of the type "How should I teach my children to write?" to a cognitive system, such as the IBM Watson™ Question and Answer (QA) system, for example. Through processing of the question by the QA pipeline of the cognitive system, an answer of the type "Kids should start writing upper-case letters at age 5" is generated. Based on operation of the mechanisms of the illustrative embodiments, the question and answer are analyzed to identify temporal characteristics in one or both of the question and answer. In this case, the question does not specifically identify a temporal characteristic and there may not be any correlation of keywords, key phrases, or concepts in the question to particular temporal characteristics. However, the answer does have a temporal characteristic in that the answer mentions the "age" of the child. Thus, the mechanisms of the illustrative embodiments will determine that there is a possibility of a need to schedule a reminder notification.

As a result of the answer generation and the analysis of the question/answer to determine if there is a temporal characteristic potentially indicative of a need for scheduling a reminder notification, the cognitive system returns a response to the user indicating the answer, i.e. "Kids should start writing upper-case letters at age 5" along with a request, or follow-on question, asking the user if the user would like to be notified or receive a reminder of the answer at a best appropriate time. The user may then respond with "Yes" or "No" in the example scenario, although in other embodiments, the user may be presented with options for setting the reminder notification timeframe according to a user preference, e.g., by way of predefined timeframe values, free-form fields for the user to enter the timeframe, or the like.

At this point, it should be noted that in the example scenarios shown in FIGS. 4A-4C, the entry of the question as well as the receipt of the answer and requests/follow-on questions are provided in the form of a textual messaging session between the user and the cognitive system. However, this is intended as just one example of the way in which the user may interface with the cognitive system and any other known or later developed manner for exchanging information with a user and presenting results of the operations of the cognitive system may be used without departing from the spirit and scope of the illustrative embodiments including, but not limited to, graphical user interfaces, audible messaging with voice recognition, electronic mail correspondence, or the like.

In response to a "Yes" response from the user indicating that the user would like to have a reminder notification scheduled, the mechanisms of the illustrative embodiments may schedule the reminder notification based on a default timeframe that is user and answer independent, a user specified timeframe in a user profile or specified in the response to the request/follow-on question, a default timeframe determined from analysis of a domain, analysis of the user profile and information in the user profile with regard to its relevance to concepts in the question/answer, analysis of the user's previous actions with regard to tasks or subtasks associated with the answer to the question, a prioritized combination of the above, a weighted function of a combination of the above, or the like.

In the example shown in FIG. 4A, the user's profile is evaluated which includes information about the user's children including their birthdays and/or ages so that it can be determined that the ages of the user's children are 5 and 2. Based on this information, and a timeframe determined by the mechanisms of the illustrative embodiments, a reminder notification is scheduled for 3 weeks prior to the younger child's $5^{th}$ birthday (the older child has already met the timeframe of 5 years old and thus, is not used as a basis for scheduling the reminder notification). This reminder notification is stored as an entry in the reminder notification database which is then continuously, periodically, or in response to an event, checked to determine if the answer to the question has changed, as well as check to see if the reminder notification has been triggered.

In this example scenario, the entry in the database is checked periodically between the time the question was originally submitted by the user and the scheduled time that the reminder notification is to be sent to the user. For example, it is assumed that a year from the date of the original submission of the question to the cognitive system, the answer changes to an answer of "Kids should start writing lower-case letters at age 4." Comparing this new answer to the old answer, the mechanisms of the illustrative embodiments determine that there is a significant change in the answer since the answer now mentions "lower-case" letters and the numerical value of the age has changed from 5 to 4. As a result, a notification is sent to the user of the change in the answer along with a request as to whether the user wishes to update the reminder notification status, cancel the reminder notification, or leave the reminder notification unchanged. If the user selects to cancel the reminder notification, then the entry for the reminder notification is placed into an inactive state and may be overwritten. If the user selects to leave the reminder notification unchanged, then the reminder notification timeframe is not changed, however the entry may be updated to reflect the new answer as the current answer for the question such that repeated notifications are not sent to the user when the user has already been informed of the update to the answer. Only additional changes to the answer will cause subsequent change notifications.

If the user selects to update the reminder notification, the mechanisms of the illustrative embodiments will again be executed to calculate the best timeframe for scheduling the reminder notification based on the new answer. In this example scenario, by looking at the user's profile it is determined that the user's children are now age 6 and 3. As a result, the cognitive system updates the reminder notification entry with a new reminder notification timeframe and/or scheduled reminder notification time to be approximately 3 weeks prior to the younger child's $4^{th}$ birthday. Thus, as shown in FIG. 4A, reminder notifications may be set for answers to previously asked questions and the answers to these reminder notifications may be checked for updates with subsequent updating of the reminder notifications when appropriate.

FIG. 4B illustrates an example scenario in which previous user history of activity is used to calculate a reminder notification timeframe in accordance with one illustrative embodiment. As shown in FIG. 4B, the scenario again starts with the user submitting an original question of the type "When should I get a flu shot?" with the QA pipeline of the cognitive system generating the answer "September" and the request/follow-on question asking if the user wishes a reminder notification to be set (based on the fact that the question and answer both have temporal characteristics). In response to the user responding with a "Yes" answer, the cognitive system looks to the user's mobile phone records 420 including a call log and an electronic calendar application to determine how long it takes the user to have recommended medical treatment administered. From the call log, the mechanisms of the illustrative embodiment determine that the user called the user's doctor on a particular date, and from the electronic calendar application, the mechanisms of the illustrative embodiment determine that the user's subsequent appointment with the doctor was scheduled 4 weeks later than the call date. Thus, the mechanisms of the illustrative embodiment determine that the user requires 4 weeks to schedule an appointment to have a medical treatment. As a result, the reminder notification for the user to obtain the flu shot is scheduled 4 weeks prior to next September. This information, along with the question, answer, and other reminder notification database entry information as discussed above, is stored in an entry in the reminder notification database. Thus, the illustrative embodiments are able to set reminder notifications for answers to previously submitted questions based on a timeframe determined from the analysis of prior actions of the user.

FIG. 4C illustrates an example scenario in which previous user history of activity as well as breaking down a task into sub-tasks is utilized to calculate a reminder notification timeframe in accordance with one illustrative embodiment. As with the previous scenarios, the scenario starts with the user submitting an original question, e.g., "When is the best time to have an outdoor party?", with a subsequent answer being generated by the QA pipeline of the cognitive system, e.g., "May". It should be noted that this answer may have been generated based on many factors including the use's geographic location, historical weather conditions, or the like. As with the previous scenarios, since the question and the answer both include temporal characteristics, the mechanisms of the illustrative embodiments request or provide a follow-on question as to whether the user would like to have a reminder notification scheduled for the answer to the question.

In response to the user responding with a "Yes" answer to the request or follow-on question, the mechanisms of the illustrative embodiments may look into various applications associated with the user that store information about previous activities of the user. One such application may be a to-do application, notes application, calendar application, or the like, which stores information about previous events that the user may have coordinated. For example, the user's to-do application may store an entry for a previous birthday party hosted by the user along with a listing of sub-tasks that the user needed to perform to host the birthday party, such as creating invitations, sending invitations, getting paper supplies, buying food, etc. Each of these sub-tasks may have associated entries that specify a time/date when they were "checked-off" or otherwise indicated as having been completed. For example, it may be determined that the user created the invitations four days before mailing the invitations which was completed 8 weeks (2 months) prior to the scheduled birthday party. In addition, it may be determined that the user bought the food for the party 3 days prior to the party and obtained the paper supplies 1 day prior to the party. Based on the aggregate of these timeframes associated with the sub-tasks, the mechanisms of the illustrative embodiments may determine that a reminder notification for the best time to have an outdoor party should be scheduled for approximately 2 months and 4 days prior to next May. A corresponding entry may then be created and stored in the reminder notification database.

Thus, the illustrative embodiments provide mechanisms for generating reminder notifications for answers to input questions. The reminder notifications may be scheduled according to various criteria including default timeframes, domain related time intervals, user personal information in user profiles as it relates to concepts in the answer to the question, analysis of similar questions and their associated schedules of reminder notifications, activity histories of the user, activity histories of other users, and the like. The illustrative embodiments further provide mechanisms for checking for updates to answers to previous questions and notifying users of changes to these answers. The mechanisms also provide logic and functionality for updating reminder notifications based on changes to the answer to the question and/or postponement of the reminder notification. Overall, these mechanisms provide for an enhancement to cognitive systems by making answers to questions available when they are of most use to the user based on the temporal aspects of the question and/or the answer.

Figure 5:
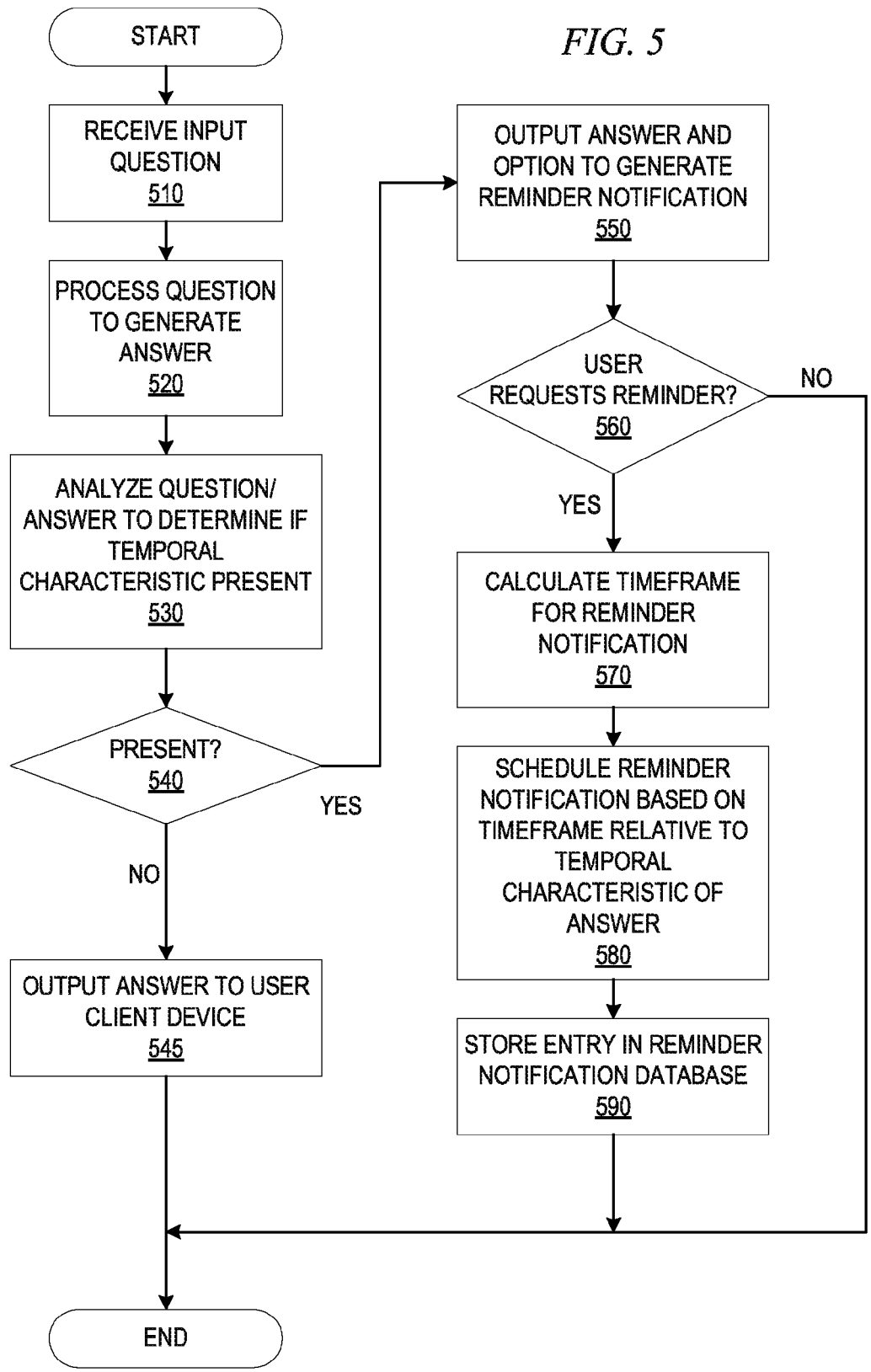
FIG. 5 is a flowchart outlining an example operation for providing an answer reminder notification in accordance with one illustrative embodiment.

FIG. 5 is a flowchart outlining an example operation for providing an answer reminder notification in accordance with one illustrative embodiment. As shown in FIG. 5, the operation starts with receiving an input question (step 510). The input question is processed by the QA pipeline to generate an answer (step 520). The question and answer are analyzed to determine if they include any temporal characteristics (step 530). As discussed above, this may involve identifying explicitly specified temporal characteristics in the question/answer, concepts related to temporal characteristics, or the like. These determinations as to whether temporal characteristics are present may be based on identification of keywords, key phrases, concepts, or the like as discussed above.

If the question/answer does not contain any temporal characteristics, the answer is output to the user client device that submitted the input question (step 545) and the operation terminates. If the question/answer does contain at least one temporal characteristic, then the answer is output to the user client device along with an option to generate a reminder notification for the answer (step 550). A determination is made as to whether the user requests that such an answer reminder notification be generated (step 560). If not, the operation terminates. If the user does request an answer reminder notification, the timeframe for the reminder notification is calculated (step 570) and the reminder notification is scheduled based on the timeframe relative to the temporal characteristic of the answer (step 580). A corresponding entry is then stored in the reminder notification database for use is generating a reminder notification at a later time closer to the time at which the answer will be of most use to the user (step 590). The operation then terminates.

Figure 6:
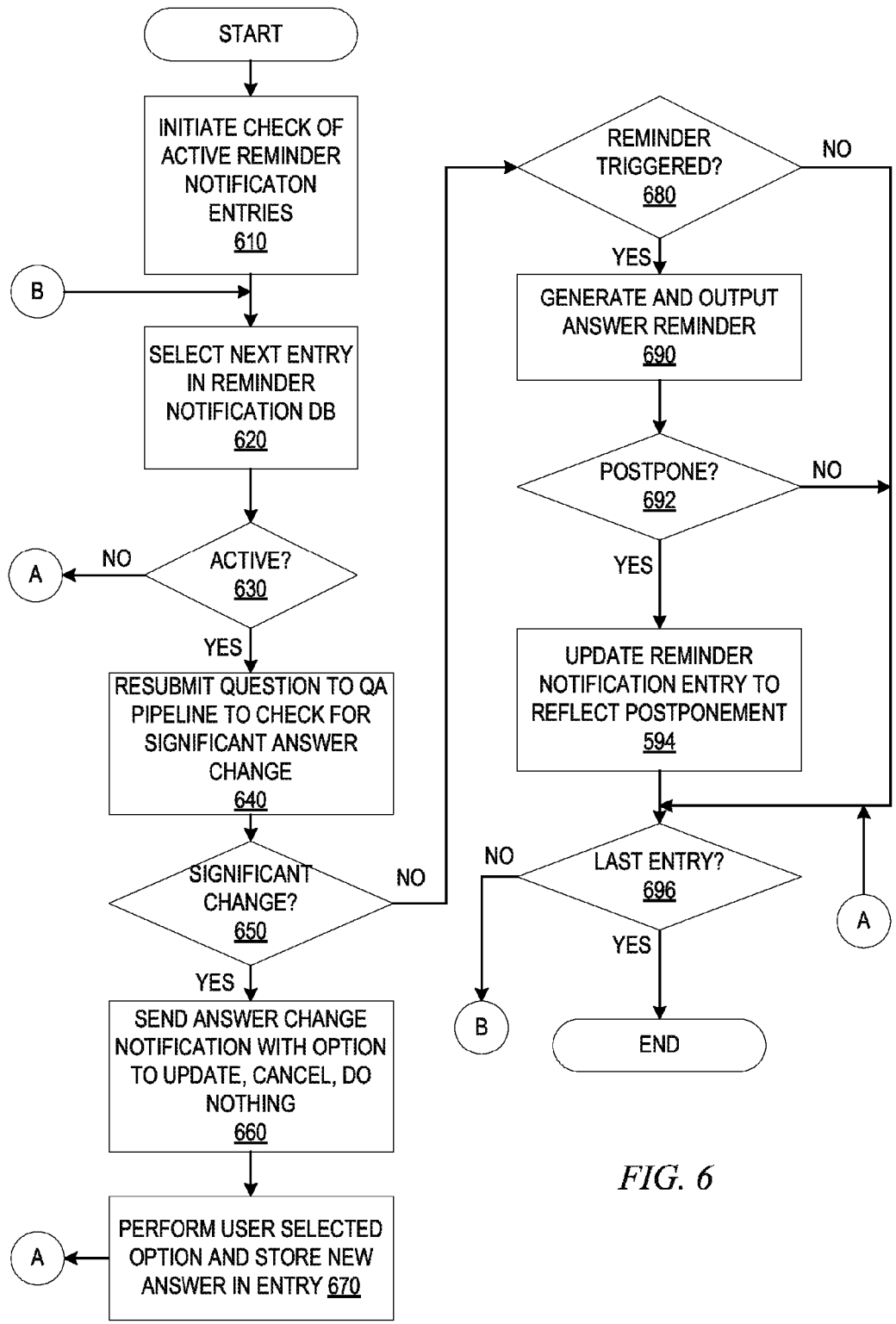
FIG. 6 is a flowchart outlining an example operation for checking active entries in a reminder notification database in accordance with one illustrative embodiment.

FIG. 6 is a flowchart outlining an example operation for checking active entries in a reminder notification database in accordance with one illustrative embodiment. As shown in FIG. 6, the operation starts with the initiation of a check of active reminder notification entries in the reminder notification database (step 610). As mentioned above, this may be done on a continuous basis, periodically, or in response to an event, such as an administrator requesting the check to be performed, an update to a corpus of documents used to generate answers to questions by the QA system, or any other suitable event.

In response to initiating the check of the active reminder notification entries, the next entry in the reminder notification database is selected (step 620) and a determination is made as to whether this entry is active or not (step 630). If the entry is not active, e.g., its active bit is set to a non-active state value, then the operation jumps to step 696 where it is determined if the entry is the last entry (step 696). If it is not the last entry, the operation returns to step 620 where the next entry is selected. If the entry is the last entry, the operation terminates.

If the entry is active, the question associated with the entry is resubmitted to the QA pipeline to check for a significant change in the answer (step 640). A determination is made as to whether the answer has significantly changed since either the original answer was generated or the most current version of the answer was generated, assuming a prior check was made resulting in a change to the answer (step 650). If there is a significant change in the answer to the question, as may be determined in a variety of ways by comparing the current answer to the previous answer as noted above, then an answer change notification is sent to the user with an option to update the reminder notification, cancel the reminder notification, or not make any change to the reminder notification (step 660). Thereafter, whichever option that is selected by the user is then performed by the cognitive system to either update, cancel, or do nothing to the reminder notification entry in the reminder notification database (step 670). The operation then proceeds to step 696 to check to see if it is the last entry or not and either terminate or return to step 620 to select the next entry.

If there has not been a significant change in the answer to the input question, a determination is made as to whether the reminder notification has been triggered (step 680). A reminder notification is triggered if the current date/time (timeframe) equals or is later than the scheduled timeframe of the reminder notification. If not, the operation again branches or jumps to step 696. If the reminder notification has been triggered, the answer reminder notification is generated and output (step 690). As mentioned above, this answer reminder notification may comprise the question, the answer, a history of changes to the answer, and an option to postpone the reminder notification. The answer reminder notification may be output based on contact information for the user stored in the entry corresponding to the reminder notification in the reminder notification database.

A determination is made as to whether the user has responded with a request to postpone the reminder notification within a predetermined time period (step 692). If the user has not requested postponement, or the option to postpone has timed out, i.e. the predetermined time period has expired, then the entry is marked as inactive and the operation again branches/jumps to step 696. If the user has requested postponement, then the reminder notification entry in the database is updated to reflect the postponement time period and the entry remains active. The operation then continues to step 696 as discussed above.

Figure 7:
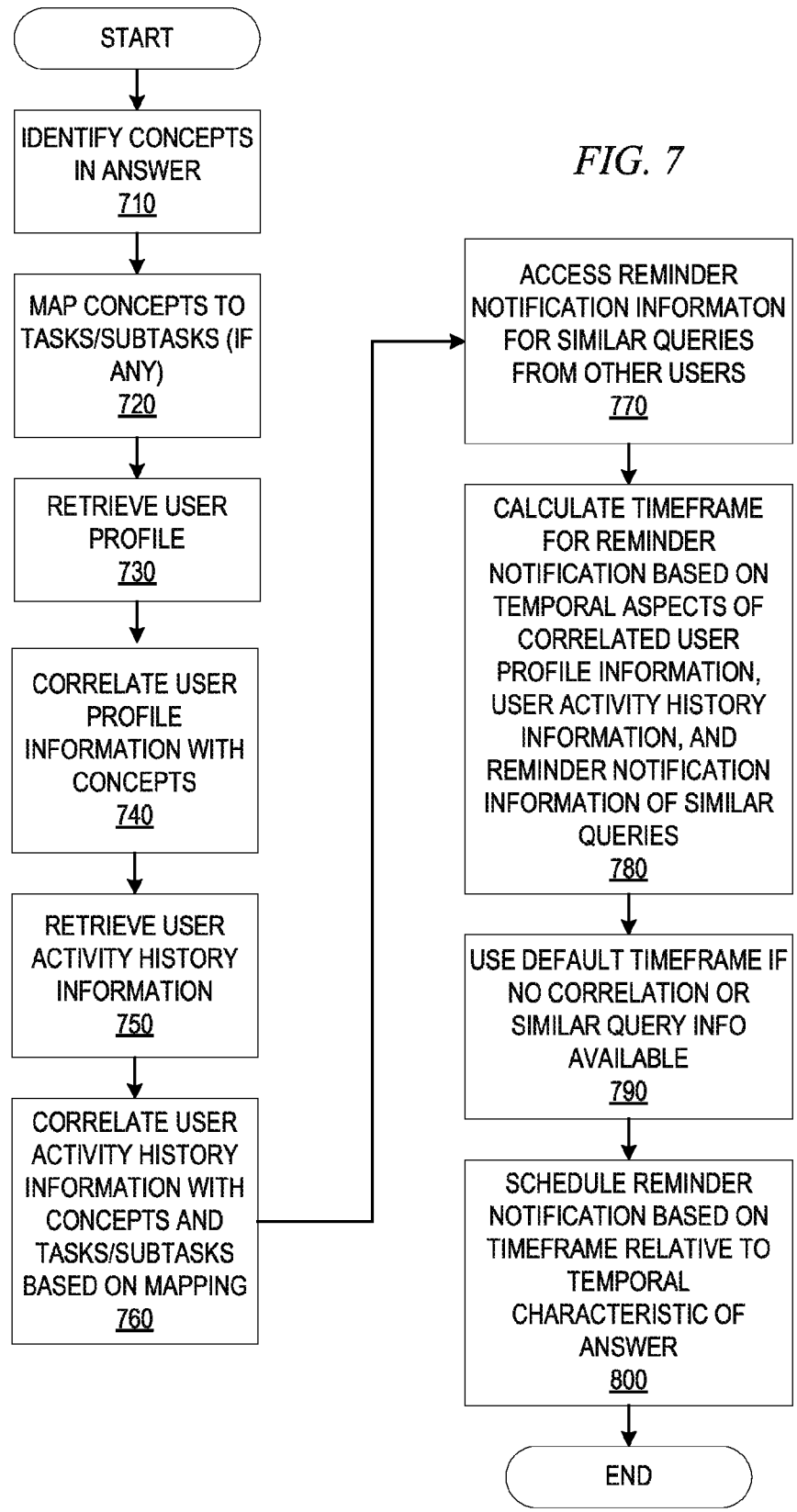
FIG. 7 is a flowchart outlining an example operation for calculating a timeframe for scheduling a reminder notification in accordance with one illustrative embodiment.

FIG. 7 is a flowchart outlining an example operation for calculating a timeframe for scheduling a reminder notification in accordance with one illustrative embodiment. The operation outlined in FIG. 7 assumes that an answer to a natural language question has already been generated by a QA system, the user has been notified of the answer, and the user has selected to have a reminder notification of the answer scheduled, or alternatively, the reminder notification is automatically being set. As such, the process in FIG. 7 is to determine the timeframe to use in determining when to schedule the reminder notification.

As shown in FIG. 7, the operation starts by identifying concepts in the answer (step 710) and mapping these concepts to tasks/sub-tasks (if any) (step 720). A user profile for the user submitting the original natural language question is retrieved (step 730) and user profile information, e.g., demographic information, contact information, family information, associations, and the like, is correlated with the concepts in the answer (step 740). User activity history information is retrieved, such as from "to-do" lists, calendar entries, posts to various social network, newsgroups, or the like, electronic communications, such as electronic mail messages, instant messages, Tweets on Twitter™, or any other type of electronic communication (step 750). The user activity history information is correlated with the concepts and tasks/sub-tasks based on the concept mapping (step 760). In addition, reminder notification information for similar queries from other users is accessed to identify timeframes used to schedule reminder notifications for these similar queries (step 770).

It should be appreciated that each of these sources of information, e.g., user profile information, user activity information, and reminder notification information for similar queries, have associated temporal aspects associated with them that is mapped to a task/sub-task via the concept mapping. These temporal aspects may be associated with these various tasks/sub-tasks to generate a representation of how much time it is likely to take to perform the particular task/sub-task. A combination of the temporal aspects associated with the concepts, tasks, and/or sub-tasks, a timeframe for the reminder notification is calculated (step 780). As mentioned above, a weighted function for calculating this timeframe based on these various components of the timeframe calculation may be utilized to accomplish this. Of course, if the operations of steps 730-780 results in an inability to correlate user profile information, user activity history information, and notification information for similar queries sufficiently, a default timeframe may be selected for use in scheduling the reminder notification (step 790). This default timeframe may be specified in a user profile, an arbitrarily selected timeframe for all users, a default timeframe for the domain of the natural language question, or the like. Alternatively, the user may set a setting in the user profile information stating that a default timeframe should be used and in such a case, the operations of steps 740-780 may be bypassed. Based on the determined timeframe, the reminder notification is scheduled relative to the temporal characteristic of the answer (step 800) and the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory that operate to implement a natural language processing system, the method comprising:
   generating, by the natural language processing system implemented by the data processing system, a result of processing a natural language query;
   determining, by the data processing system, that at least one of the natural language query or the result comprises a temporal characteristic;
   in response to determining that at least one of the natural language query or the result comprises a temporal characteristic, analyzing, by the data processing system, at least one of user profile information or user activity history information for a user to identify user characteristics indicative of a timeframe for scheduling a reminder notification of the result;
   calculating, by the data processing system, the timeframe for scheduling the reminder notification based on results of analyzing the user profile information or user activity history information;
   scheduling, by the data processing system, a reminder notification to be output at a scheduled reminder notification time based on the calculated timeframe; and
   at a later time, in response to the later time being equal to or later than the scheduled reminder notification time, outputting the reminder notification to a client device associated with the user, wherein the reminder notification specifies the result generated for the natural language query.

2. The method of claim 1, wherein analyzing at least one of the user profile information or user activity history information comprises:
   correlating portions of information in the user profile information with concepts specified in the result;
   identifying first temporal aspects of the correlated portions of information and second temporal aspects of the correlated concepts specified in the result;
   comparing the first temporal aspects and second temporal aspects to determine a correlated user profile information timeframe; and
   calculating the timeframe for scheduling the reminder notification of the result based on the correlated user profile information timeframe.

3. The method of claim 1, wherein analyzing at least one of the user profile information or user activity history information comprises:
   correlating portions of the information in the user activity history information with concepts specified in the result to identify a task previously performed by the user that is similar to a task associated with a concept specified in the result;
   identifying a temporal aspect associated with the previously performed task; and
   calculating the timeframe for scheduling the reminder notification of the result based on the temporal aspect associated with the previously performed task.

4. The method of claim 3, wherein:
   correlating portions of information in the user activity history information with concepts specified in the result comprises generating a concept map that maps concepts specified in the result to tasks or sub-tasks,
   identifying a temporal aspect associated with the previously performed task comprises determining, for each task or sub-task in the concept map, an estimated time to complete the task or sub-task based on the user activity history information, and
   calculating the timeframe for scheduling the reminder notification of the result based on the temporal aspect associated with the previously performed task comprises combining the estimated times of completion of the tasks and sub-tasks in the concept map to generate the timeframe.

5. The method of claim 1, wherein analyzing at least one of the user profile information or user activity history information comprises:
   correlating first portions of information in the user profile information with concepts specified in the result;

identifying first temporal aspects of the correlated first portions of information and second temporal aspects of the correlated concepts specified in the result;

comparing the first temporal aspects and second temporal aspects to determine a correlated user profile information timeframe;

correlating second portions of the information in the user activity history information with the concepts specified in the result to identify a task previously performed by the user that is similar to a task associated with a concept specified in the result;

identifying a third temporal aspect associated with the previously performed task; and calculating the timeframe for scheduling the reminder notification of the result based on the correlated user profile information timeframe and the third temporal aspect associated with the previously performed task.

6. The method of claim 1, further comprising:

analyzing, by the data processing system, reminder notification data for one or more other users to identify scheduled reminder notification times generated for results generated for similar natural language queries submitted by the one or more other users; and calculating, by the data processing system, the timeframe for scheduling the reminder notification based on results of analyzing the reminder notification data for the one or more other users.

7. The method of claim 1, wherein the natural language processing system is a Question and Answer (QA) system, the natural language query is a natural language question input to the QA system, and the result is an answer generated by the QA system for the natural language question.

8. The method of claim 1, wherein the natural language processing system is a search engine, the natural language query is a search query input to the search engine, and the result comprises at least one search result generated by the search engine.

9. The method of claim 1, further comprising:

automatically checking, by the data processing system, for a change in the result at a time between the current time and the scheduled reminder notification time;

in response to a change in the result being identified, determining, by the data processing system, whether the change in the result is significant enough to send a change notification to the user; and in response to the change in the result being significant enough to send a change notification to the user, outputting, by the data processing system, a notification of the change in the result to the client device associated with the user.

10. The method of claim 9, wherein the reminder notification further specifies a history of changes to the result occurring from a time that the result was generated for the natural language query and the scheduled reminder notification time.

11. A computer program product comprising a computer readable storage medium having a computer readable program stored therein, wherein the computer readable program, when executed on a computing device implementing a natural language processing system, causes the computing device to:

generate, by a natural language processing system implemented by the data processing system, a result of processing a natural language query;

determine that at least one of the natural language query or the result comprises a temporal characteristic;

analyze, in response to determining that at least one of the natural language query or the result comprises a temporal characteristic, at least one of user profile information or user activity history information for a user to identify user characteristics indicative of a timeframe for scheduling a reminder notification of the result;

calculate the timeframe for scheduling the reminder notification based on results of analyzing the user profile information or user activity history information;

schedule a reminder notification to be output at a scheduled reminder notification time based on the calculated timeframe; and output, at a later time, in response to the later time being equal to or later than the scheduled reminder notification time, the reminder notification to a client device associated with the user, wherein the reminder notification specifies the result generated for the natural language query.

12. The computer program product of claim 11, wherein the computer readable program further causes the computing device to analyze at least one of the user profile information or user activity history information at least by:

correlating portions of information in the user profile information with concepts specified in the result;

identifying first temporal aspects of the correlated portions of information and second temporal aspects of the correlated concepts specified in the result;

comparing the first temporal aspects and second temporal aspects to determine a correlated user profile information timeframe; and calculating the timeframe for scheduling the reminder notification of the result based on the correlated user profile information timeframe.

13. The computer program product of claim 11, wherein the computer readable program further causes the computing device to analyze at least one of the user profile information or user activity history information at least by:

correlating portions of the information in the user activity history information with concepts specified in the result to identify a task previously performed by the user that is similar to a task associated with a concept specified in the result;

identifying a temporal aspect associated with the previously performed task; and calculating the timeframe for scheduling the reminder notification of the result based on the temporal aspect associated with the previously performed task.

14. The computer program product of claim 13, wherein:

correlating portions of information in the user activity history information with concepts specified in the result comprises generating a concept map that maps concepts specified in the result to tasks or sub-tasks, identifying a temporal aspect associated with the previously performed task comprises determining, for each task or sub-task in the concept map, an estimated time to complete the task or sub-task based on the user activity history information, and calculating the timeframe for scheduling the reminder notification of the result based on the temporal aspect associated with the previously performed task comprises combining the estimated times of completion of the tasks and sub-tasks in the concept map to generate the timeframe.

15. The computer program product of claim 11, wherein the computer readable program further causes the computing device to analyze at least one of the user profile information or user activity history information at least by:

correlating first portions of information in the user profile information with concepts specified in the result;

identifying first temporal aspects of the correlated first portions of information and second temporal aspects of the correlated concepts specified in the result;

comparing the first temporal aspects and second temporal aspects to determine a correlated user profile information timeframe;

correlating second portions of the information in the user activity history information with the concepts specified in the result to identify a task previously performed by the user that is similar to a task associated with a concept specified in the result;

identifying a third temporal aspect associated with the previously performed task; and calculating the timeframe for scheduling the reminder notification of the result based on the correlated user profile information timeframe and the third temporal aspect associated with the previously performed task.

16. The computer program product of claim 11, wherein the computer readable program further causes the computing device to:

analyze reminder notification data for one or more other users to identify scheduled reminder notification times generated for results generated for similar natural language queries submitted by the one or more other users; and calculate the timeframe for scheduling the reminder notification based on results of analyzing the reminder notification data for the one or more other users.

17. The computer program product of claim 11, wherein the natural language processing system is a Question and Answer (QA) system, the natural language query is a natural language question input to the QA system, and the result is an answer generated by the QA system for the natural language question.

18. The computer program product of claim 11, wherein the natural language processing system is a search engine, the natural language query is a search query input to the search engine, and the result comprises at least one search result generated by the search engine.

19. The computer program product of claim 11, wherein the computer readable program further causes the computing device to:

automatically check for a change in the result at a time between the current time and the scheduled reminder notification time;

determine, in response to a change in the result being identified, whether the change in the result is significant enough to send a change notification to the user; and output, in response to the change in the result being significant enough to send a change notification to the user, a notification of the change in the result to the client device associated with the user.

20. The computer program product of claim 19, wherein the reminder notification further specifies a history of changes to the result occurring from a time that the result was generated for the natural language query and the scheduled reminder notification time.

21. An apparatus comprising:

a processor; and a memory coupled to the processor, wherein the memory comprises instructions which, when executed by the processor, cause the processor to:

generate, by a natural language processing system implemented by the processor, a result of processing a natural language query;

determine that at least one of the natural language query or the result comprises a temporal characteristic;

analyze, in response to determining that at least one of the natural language query or the result comprises a temporal characteristic, at least one of user profile information or user activity history information for a user to identify user characteristics indicative of a timeframe for scheduling a reminder notification of the result;

calculate the timeframe for scheduling the reminder notification based on results of analyzing the user profile information or user activity history information;

schedule a reminder notification to be output at a scheduled reminder notification time based on the calculated timeframe; and output, at a later time, in response to the later time being equal to or later than the scheduled reminder notification time, the reminder notification to a client device associated with the user, wherein the reminder notification specifies the result generated for the natural language query.

* * * * *